US009990780B2

(12) United States Patent
Kornilov et al.

(10) Patent No.: US 9,990,780 B2
(45) Date of Patent: Jun. 5, 2018

(54) USING COMPUTED FACIAL FEATURE POINTS TO POSITION A PRODUCT MODEL RELATIVE TO A MODEL OF A FACE

(71) Applicant: Ditto Technologies, Inc., San Francisco, CA (US)

(72) Inventors: Dmitry Kornilov, Menlo Park, CA (US); Andrey Nechaev, Saint Petersburg (RU)

(73) Assignee: Ditto Technologies, Inc., San Francisco, CA (US)

( * ) Notice: Subject to any disclaimer, the term of this patent is extended or adjusted under 35 U.S.C. 154(b) by 0 days. days.

(21) Appl. No.: 15/284,247

(22) Filed: Oct. 3, 2016

(65) Prior Publication Data

US 2018/0096537 A1 Apr. 5, 2018

(51) Int. Cl.
*G06T 19/20* (2011.01)
*G06K 9/00* (2006.01)

(52) U.S. Cl.
CPC .......... *G06T 19/20* (2013.01); *G06K 9/00228* (2013.01)

(58) Field of Classification Search
None
See application file for complete search history.

(56) References Cited

U.S. PATENT DOCUMENTS

| 7,555,148 | B1* | 6/2009 | Steinberg | .......... G06F 17/30247 340/5.53 |
| 2006/0078172 | A1* | 4/2006 | Zhang | ................ G06K 9/00268 382/118 |
| 2015/0055085 | A1* | 2/2015 | Fonte | ................ G06Q 30/0621 351/178 |

OTHER PUBLICATIONS

Author Unknown, Math 21a: Multivariable calculus, Distances overview, downloaded from: http://math.harvard.edu/~ytzeng/worksheet/distance.pdf, Fall 2011.

* cited by examiner

*Primary Examiner* — Said Broome
(74) *Attorney, Agent, or Firm* — Van Pelt, Yi & James LLP

(57) ABSTRACT

Using computed facial feature points to position a product model relative to a model of a face is disclosed, comprising: obtaining a three-dimensional (3D) model of a user's face, wherein the 3D model of the user's face comprises a plurality of 3D points; determining a face normal that is normal to a plane that is determined based at least in part on a first subset of 3D points from the plurality of 3D points; determining a set of computed bridge points based at least in part on a second subset of 3D points from the plurality of 3D points and the face normal; and using the set of computed bridge points to determine an initial placement of a 3D model of a glasses frame relative to the 3D model of the user's face.

21 Claims, 22 Drawing Sheets

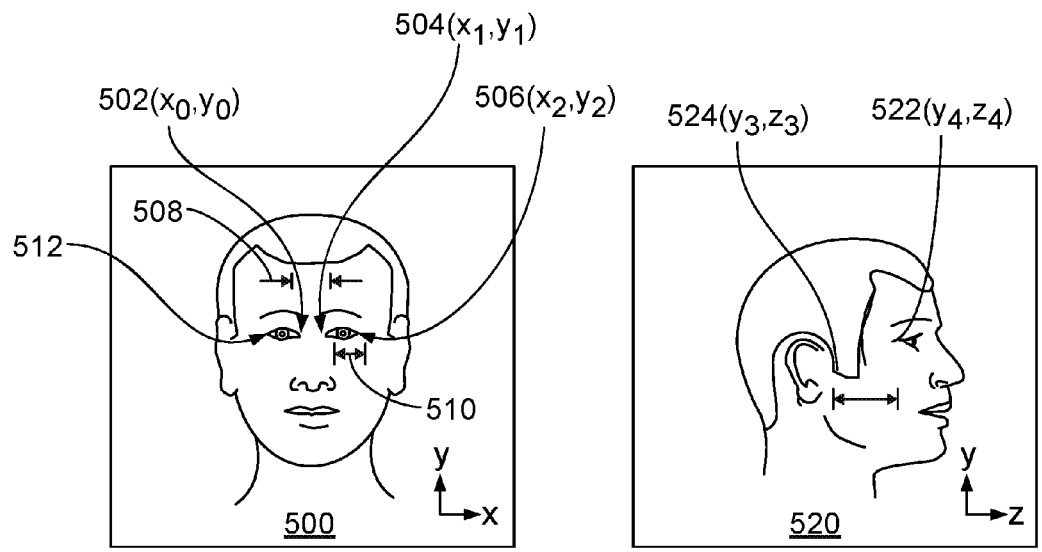
FIG. 5A    FIG. 5B
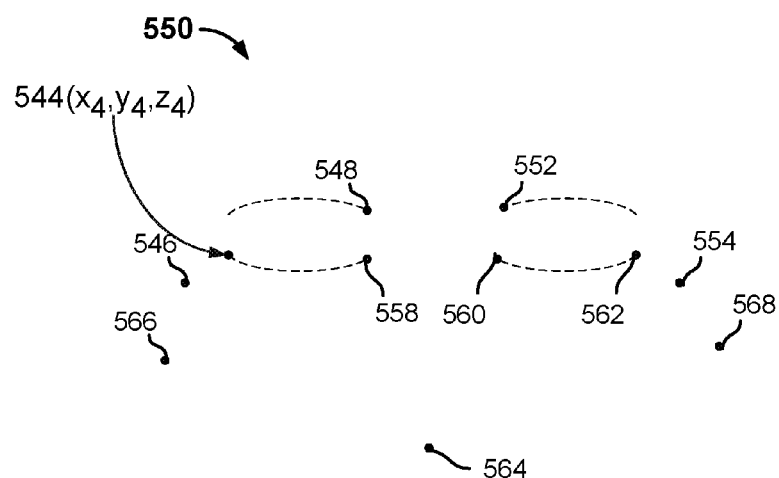
FIG. 5C

● Point from 3D model of user's face

+ Point along the nose curvature

● Point of the 3D model of the glasses frame

○ Point of the 3D model of the user's face

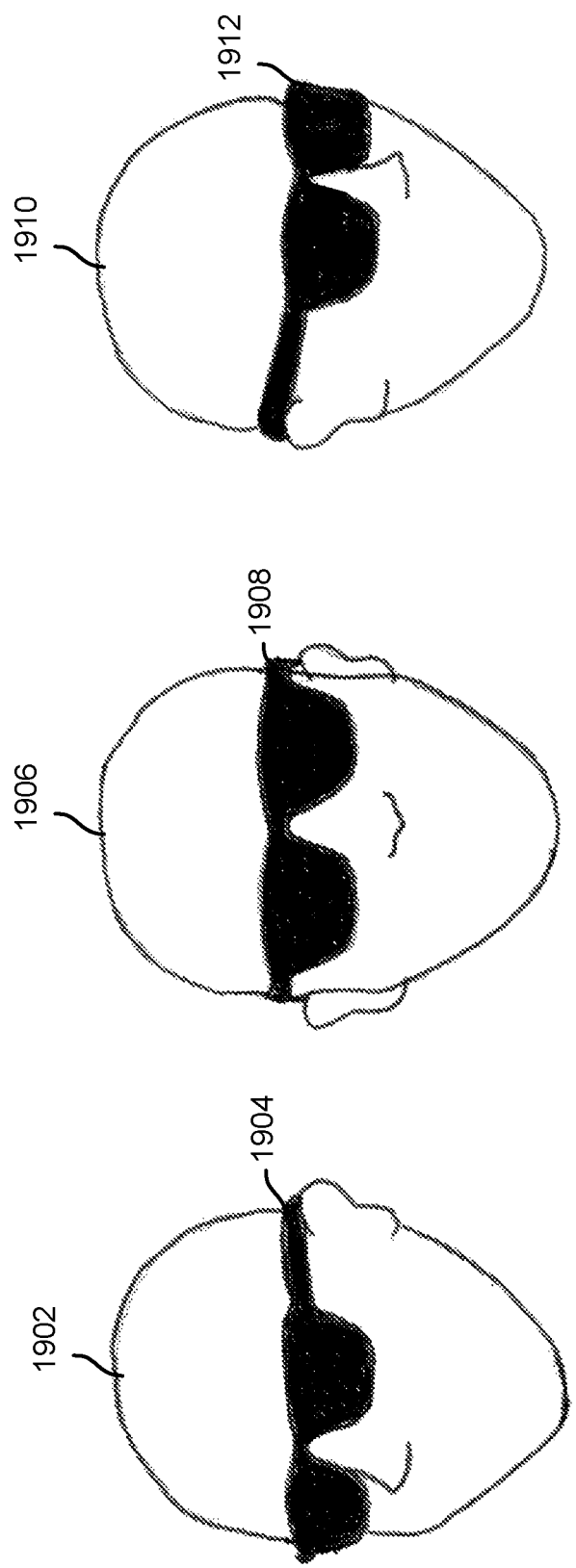

USING COMPUTED FACIAL FEATURE POINTS TO POSITION A PRODUCT MODEL RELATIVE TO A MODEL OF A FACE

BACKGROUND OF THE INVENTION

A person seeking to buy glasses usually has to go in person to an optometrist or an eyewear store and try-on several glasses frames to see if they fit them. Typically this requires a few hours of browsing through several rows of glasses frames and trying on many pairs of glasses frames, most of the time without prior knowledge of whether a particular glasses frame is suited to the person.

Allowing people to virtually try on glasses frames would greatly improve the efficiency of trying on glasses frames. However, it would be desirable for the placement of the glasses frames in the virtual try-on experience to be accurate in order to better approximate the try-on experience the person would have in the real world.

BRIEF DESCRIPTION OF THE DRAWINGS

Various embodiments of the invention are disclosed in the following detailed description and the accompanying drawings.

FIGS. 5A and 5B show an example of reference points obtained from a set of images of a user's face.

FIG. 5C shows an example 3D model of a user's face.

FIG. 19 is a diagram showing three example occlusions of a glasses frame at three different orientations.

DETAILED DESCRIPTION

Figure 1:
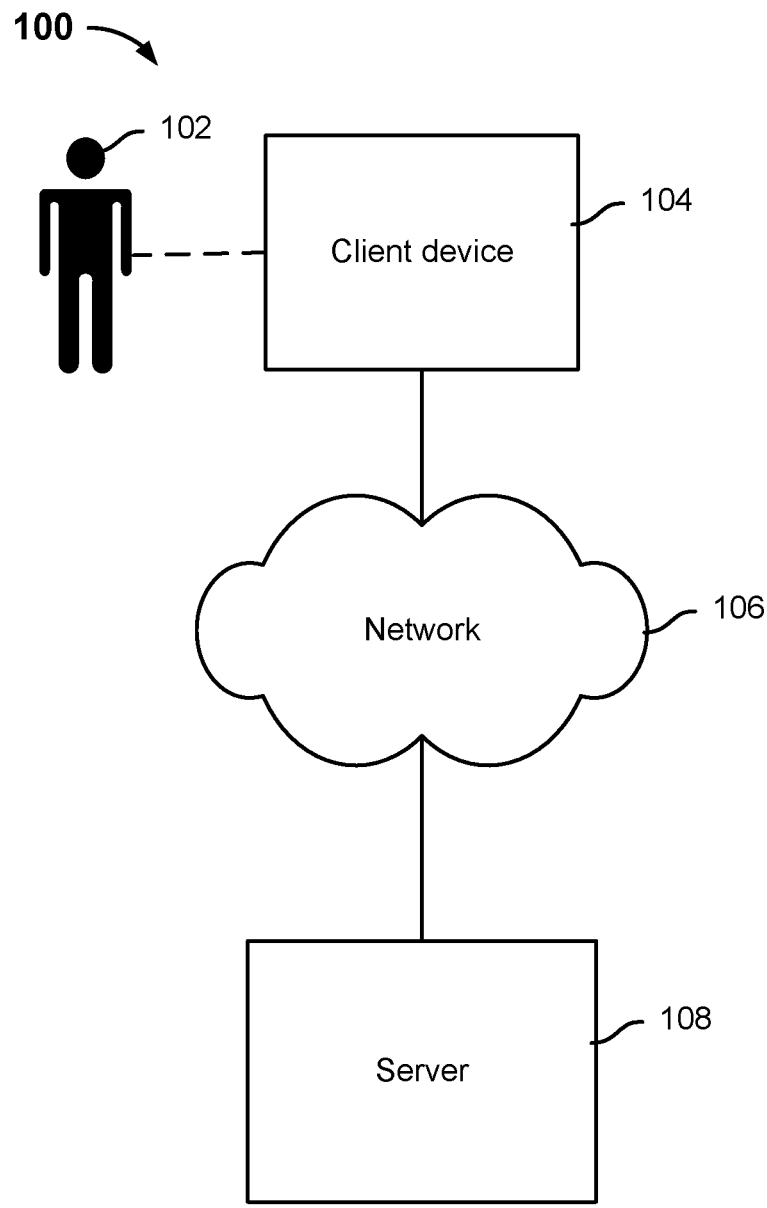
FIG. 1 is a diagram showing an embodiment of a system for using computed facial feature points to position a product model relative to a model of a face.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of using computed facial feature points to position a product model relative to a model of a face are described herein. A three-dimensional (3D) model of a user's face is determined. In various embodiments, the 3D model of the user's face comprises a plurality of 3D points. The plurality of 3D points in the 3D model of the user's face comprises reference points in 3D space that define the locations of various facial features (e.g., the two internal eyebrow points, the two internal eye corners, the two external eye corners, the two ear junctures, the two cheekbones, the nose tip) of the user. In various embodiments, the 3D model of the user's face is determined from a recorded set of images of various orientations of a user's face. In various embodiments, a user's face includes the user's head as well. For example, the set of images may be recorded as a user is turning his or her head in various directions in front of a camera. A face normal that is normal to a plane that is determined based at least in part on a first subset of 3D points from the plurality of 3D points is determined. In various embodiments, a "face normal" refers to a vector in 3D space that is parallel to a plane in 3D space that is defined based on at least three selected 3D points from the 3D model of the user's face. A set of computed bridge points is determined based at least in part on a second subset of 3D points from the plurality of 3D points and the face normal. The set of computed bridge points is then used to determine an initial placement of a 3D model of a pair of glasses frames relative to the 3D model of the user's face. In various embodiments, the initial placement of the 3D model of the pair of glasses frames relative to the 3D model of the user's face can be further modified to obtain an updated placement. In some embodiments, the placement of the 3D model of the pair of glasses frames comprises a set of locations/coordinates in 3D space that various 3D points (e.g., bridge points, temple bend points, etc.) that make up the 3D model of the glasses frame should be aligned with the 3D points that make up the 3D model of the user's face. In some embodiments, the placement of the 3D model of the pair of glasses frames comprises a set of rotation and/or translation information that is used to transform the 3D model of the glasses frame in 3D space so that various 3D points (e.g., bridge points, temple bend points, etc.) of the 3D model of the glasses frame should be aligned with the 3D points that make up the 3D model of the user's face. In various embodiments, after the 3D model of the pair of glasses frames is placed onto the 3D model of the user's face, the combination of the 3D model of the pair of glasses frames having been placed onto the 3D model of the user's face is translated and/rotated to correspond to an orientation of the user's face in a particular image of the set of recorded images. The translated and/or rotated of the 3D model of the pair of glasses frames is then rendered into a 2D image of the glasses frame. In some embodiments, the 2D images of the glasses frame are presented in a manner that overlays the image of the user's face to provide a visual of the user's face virtually trying on the glasses frame in that image with a glasses frame that is fitted to the user's facial features and the orientation of the user's face in that image.

FIG. 1 is a diagram showing an embodiment of a system for using computed facial feature points to position a product model relative to a model of a face. In the example, system 100 includes client device 104, network 106, and server 108. Network 106 includes high speed data networks and/or telecommunications networks. In some embodiments, client device 104 is configured to communicate to server 108 over network 106.

Client device 104 is configured to record or receive a set of recorded images corresponding to a user's head at various orientations. Examples of client device 104 may include a laptop computer, a desktop computer, a tablet device, a mobile device, a smart phone, and/or any computing device. For example, the set of recorded images may comprise a video or a series of snapshots. In some embodiments, client device 104 includes or is connected to a camera device. The camera device and/or a processor of client device 104 that is running an application can capture a set of images of the user's head as user 102 turns his or her head in different directions (e.g., as instructed through a user interface of the application). In various embodiments, the set of images is sent to server 108 for server 108 to process. In some embodiments, client device 104 includes a user interface through which the user may interact and view a playback associated with the images.

In various embodiments, server 108 is configured to receive a set of images sent from a client device such as client device 104. In some embodiments, server 108 searches for a (e.g., optimal) representation (e.g., a mathematical 3D model) of the user's (e.g., user 102) face associated with a set of images and also (e.g., optimal) sets of extrinsic information corresponding to respective images of the set (e.g., a set of extrinsic information is specifically determined for each image of the set). In various embodiments, the 3D model of the user's face comprises a set of points in 3D space that define the locations of various facial features.

In various embodiments, server 108 is configured to receive a selection associated with a glasses frame made by a user (e.g., user 102) at an interface associated with client device 104. In some embodiments, the selected glasses frame is selected from a list of glasses frames (e.g., that are presented with respective fit scores) that are provided by server 108. In various embodiments, server 108 is configured to render the selected glasses frame for at least a subset of a recorded set of images associated with different orientations of a user's face. Server 108 is configured to first determine the appropriate placement or fit of a 3D model of the selected glasses frame relative to the 3D model of the user's face. In various embodiments, a "placement" or "fit" between a 3D model of the selected glasses frame relative to the 3D model of the user's face describes a determined placement of the 3D model of the selected glasses frame relative to the 3D points that are included in the 3D model of the user's face. Then, server 108 is configured to determine an orientation of the placed glasses frame to match the orientation of the user's face in an image based on a set of extrinsic information determined for that image. Server 108 is configured to render the placed glasses frame with appropriate occluded portions, if any, for the image based on the set of extrinsic information and a 3D face used for occlusion. In some embodiments, server 108 is configured to create a two-dimensional (2D) rendered image of the glasses frame for the image and to overlay the 2D rendered image of the glasses frame over the image.

In some embodiments, server 108 is configured to send the at least subset of the set of images and the corresponding rendered glasses frames to client device 104. The client device 104 is configured to present the at least a subset of the set of images and corresponding rendered glasses frames at a user interface such that a user, such as user 102, can see a playback of the video that he or she had created with the selected glasses frame overlaid in each of at least a subset of the set of images to experience a virtual try-on of the selected glasses frame via the created video/series of snapshots. In some embodiments, the 2D image renderings of the glasses frame are presented to be overlaid on the recorded set of images instead of a model of the user's face that is derived from the set of images. In some embodiments, client device 104 is configured to receive user input (e.g., a finger movement tracked on a touch screen or a mouse movement) and to update the playback of the video with the overlaid renderings of the glasses frame in response to the received user input. For example, a user may be able to control the playback of the video such that the user can indicate which orientation of his or her face with the rendered glasses frame that he or she wishes to view and when.

In some embodiments, processing of a recorded set of images and/or rendering of a selected glasses frame for one or more images in the set of images described above may also be performed, at least in part, locally at client device 104. For example, server 108 can send computer code to client device 104 that client device 104 can execute to perform at least a portion of the processing and/or rendering locally.

Presenting rendered images of a glasses frame over recorded images of a user's face allows the user to visualize how he or she looks with a selected pair of glasses without the inconvenience of having to visit a physical store.

Figure 2:
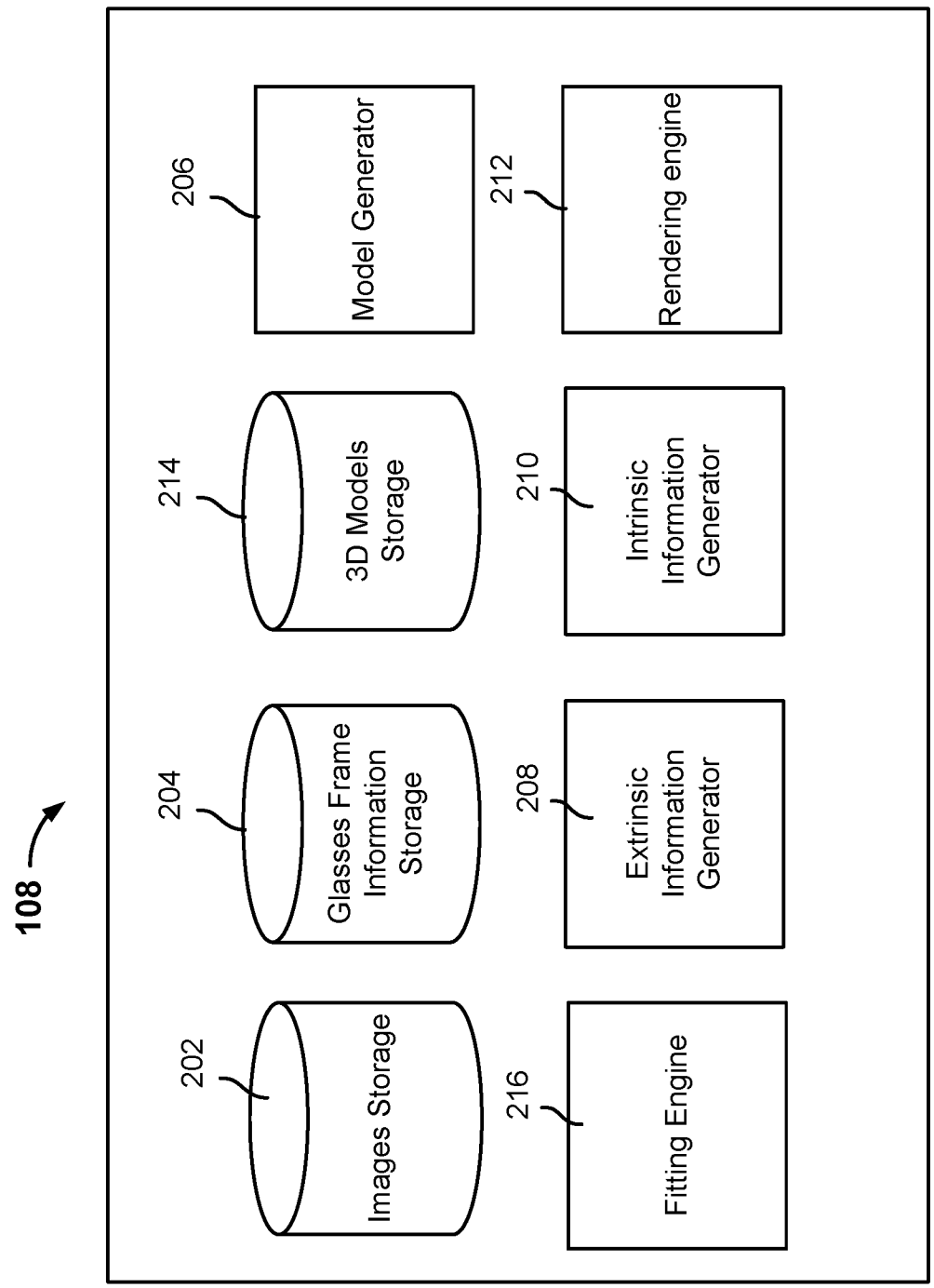
FIG. 2 is a diagram showing an embodiment of a server.

FIG. 2 is a diagram showing an embodiment of a server. In some embodiments, server 108 of system 100 of FIG. 1 is implemented using the example of FIG. 2. In the example, the server includes images storage 202, glasses frame information storage 204, 3D models storage 214, model generator 206, fitting engine 216, extrinsic information generator 208, intrinsic information generator 210, and rendering engine 212. The server may be implemented with additional, different, and/or fewer components than those shown in the example. Each of images storage 202, glasses frame information storage 204, and 3D models storage 214 may be implemented using one or more types of storage media. Each of model generator 206, fitting engine 216, extrinsic information generator 208, intrinsic information generator 210, and rendering engine 212 may be implemented using hardware and/or software.

Images storage 202 is configured to store sets of images. In some embodiments, each set of images is associated with a recorded video or a series of snapshots of various orientations of a user's face. In some embodiments, each set of images is stored with data associated with the whole set or individual images of the set.

Model generator 206 is configured to determine a mathematical 3D model for a user's face associated with each set of images. For example, the mathematical 3D model of the user's face (i.e., the mathematical model of the user's face in 3D space) may be set at the origin. In some embodiments, the 3D model of the user's face comprises a set of points in 3D space that define a set of reference points associated with (e.g., the locations of) features on the user's face from the associated set of images. Examples of reference points include endpoints of the user's eye, the endpoints of the user's eyebrows, the bridge of the user's nose, the user's ear juncture points, and the tip of the user's nose. In some embodiments, the mathematical 3D model determined for a user's face is referred to as an M matrix that is determined based on the set of reference points associated with features on the user's face from the associated set of images. In some embodiments, model generator 206 is configured to store the M matrix determined for a set of images with the set at images storage 202. In some embodiments, model generator 206 is configured to store the 3D model of a user's face at 3D models storage 214.

Fitting engine 216 is configured to determine a fit between a 3D model of a user's face (e.g., that is stored at 3D models storage) and a 3D model of a glasses frame. In some embodiments, fitting engine 216 is configured to determine a set of computed bridge points that would be included in a set of "ideal glasses" 3D points associated with a particular user. In various embodiments, the set of "ideal glasses" 3D points associated with a particular user comprises markers that can be used to determine the desired alignment or fit between the 3D model of the glasses frame and the 3D model of the user's face. In some embodiments, in determining the set of computed bridge points, fitting engine 216 is configured to determine a plane in 3D space using at least three points from the set of 3D points that are included in the 3D model of the user's face. For example, the plane is determined using the two internal eye corners and the two ear juncture points from the 3D model of the user's face. Fitting engine 216 is configured to determine a vector that is parallel to the plane and this vector is sometimes referred to as the "face normal." The distance between the midpoint of the two internal eyebrow points and the midpoint of the two internal eye corners along the face normal is computed and is sometimes referred as the "eyebrow z-delta." Fitting engine 216 is configured to determine a "bridge shift" value by multiplying the eyebrow z-delta by a predetermined coefficient. For example, the coefficient is close to 1.0 and was computed heuristically. Fitting engine 216 is configured to determine the set of computed bridge points by moving each of the two internal eye corners of the 3D model of the user's face towards the camera in the direction of the face normal by the bridge shift value. In some embodiments, fitting engine 216 is also configured to determine a vertical shift, which is determined as a function of the distance between the midpoint of the two internal eyebrow points and the midpoint of the two internal eye corners and a predetermined coefficient. In some embodiments, the set of computed bridge points is further moved along the distance between the midpoint of the two internal eyebrow points and the midpoint of the two internal eye corners based on the vertical shift. In some embodiments, other 3D points that are included in the set of ideal glasses 3D points are two temple bend points, which fitting engine 216 is configured to set to equal the two ear juncture points of the 3D model of the user's face. In some embodiments, the initial placement of the 3D model of the glasses frame relative to the 3D model of the user's face can be determined using the two bridge points and/or the two temple bend points of the set of ideal glasses 3D points. In some embodiments, fitting engine 216 is configured to determine the initial placement by aligning a line between the bridge points of the 3D model of the glasses frame with the line between the computed bridge points of the set of ideal glasses 3D points associated with the user. Then, the bridge points of the 3D model of the glasses frame are positioned by fitting engine 216 such that the midpoints of both the bridge points of the 3D model of the glasses frame and the computed bridge points of the set of ideal glasses 3D points associated with the user are in the same position or within a predetermined distance of each other. The bridge points of the 3D model of the glasses frame are then fixed and the temple bend points of the 3D model of the glasses frame are rotated about the overlapping bridge lines, which serve as an axis, such that the temple bend points of the 3D model of the glasses frame are aligned or within a predetermined distance of the ear juncture points of the 3D model of the user's face. As described above, in some embodiments, the ear juncture points of the 3D model of the user's face are sometimes referred to as the temple bend points of the set of ideal glasses 3D points associated with the user.

In some embodiments, after or alternative to determining an initial placement of the 3D model of the glasses frame relative to the 3D model of the user's face, fitting engine 216 is configured to determine a set of nose curve points in 3D space that is associated with a user. The set of nose curve points associated with the user can be used to determine a placement of the 3D model of the glasses frame relative to the 3D model of the user's face or modify an initial placement of the 3D model of the glasses frame relative to the 3D model of the user's face that was determined using the set of ideal glasses 3D points. In some embodiments, fitting engine 216 is configured to determine the set of nose curve points in 3D space by morphing a predetermined 3D face to correspond to the 3D model of the user's face. In some embodiments, the predetermined 3D face comprises a 3D model of a generic face. In some embodiments, the predetermined 3D face includes a predetermined set of points along the nose curve. In some embodiments, morphing the predetermined 3D face to correspond to the 3D model of the user's face comprises moving the corresponding locations/vertices (and their respective neighborhood vertices) of the predetermined 3D face to match or to be closer to corresponding locations on the 3D model of the user's face. After the predetermined 3D face has been morphed, the predetermined set of points along the nose curvature has also been moved as a result of the morphing. As such, after the predetermined 3D face has been morphed, the updated locations in 3D space of the predetermined set of points along the nose curve of the predetermined 3D face are referred to as a morphed set of 3D points of the morphed nose curvature associated with the user. In some embodiments, fitting engine 216 is configured to modify the initial placement of the 3D model of the glasses frame relative to the 3D model of the user's face by determining a segment between two adjacent points among the morphed set of nose curvature points associated with the user that is the closest to the bridge points of the 3D model of the glasses frame and compute a normal to this segment, which is sometimes referred to as the "nose curvature normal." Then, fitting engine 216 is configured to then position the 3D model of the glasses frame along the nose curvature normal toward this segment until the bridge points of the 3D model of the glasses frame are within a predetermined distance of the segment. In some embodiments, fitting engine 216 is further configured to bend the temple bend points of the 3D model of the glasses frame to align with the ear juncture points of the 3D model of the user's face.

Extrinsic information generator 208 is configured to determine a set of extrinsic information for each of at least a subset of a set of images. For example, the set of images may be stored at images storage 202. In various embodiments, a set of extrinsic information corresponding to an image of a set of images describes one or more of the orientation and translation of the 3D model of the user's face determined for the set of images needed to result in the correct appearance of the user's face in that particular image. In some embodiments, the set of extrinsic information determined for an image of a set of images associated with a user's face is referred to as an (R, t) pair where R is a rotation matrix and t is a translation vector corresponding to that image. As such, the (R, t) pair corresponding to an image of a set of images can transform the M matrix (that represents the 3D of the user's face) corresponding to that set of images (R×M+t) into the appropriate orientation and translation of the user's face that is shown in the image associated with that (R, t) pair. In some embodiments, extrinsic information generator 208 is configured to store the (R, t) pair determined for each of at least a subset of a set of images with the set at images storage 202.

Intrinsic information generator 210 is configured to generate a set of intrinsic information for a camera associated with recording a set of images. For example, the camera was used to record a set of images stored at images storage 202. In various embodiments, a set of intrinsic information corresponding to a camera describes a set of parameters associated with the camera. For example, a parameter associated with a camera comprises a focal length. In some embodiments, the set of intrinsic information associated with a camera is found by correlating points on a scaling reference object between different images of the user with the scaling reference object in the images, and calculating the set of intrinsic information that represents the camera's intrinsic parameters using a camera calibration technique. In some embodiments, the set of intrinsic information associated with a camera is found by using a technique of auto-calibration which does not require a scaling reference. In some embodiments, the set of intrinsic information associated with a camera is referred to as an I matrix. In some embodiments, the I matrix projects a version of a 3D model of a user's face transformed by an (R, t) pair corresponding to a particular image onto the 2D surface of the focal plane of the camera. In other words, I×(R×M+t) results in the projection of the 3D model, the M matrix, in the orientation and translation transformed by the (R, t) pair corresponding to an image, onto a 2D surface. The projection onto the 2D surface is the view of the user's face as seen from the camera. In some embodiments, intrinsic information generator 210 is configured to store an I matrix determined for the camera associated with a set of images with the set at images storage 202.

Glasses frame information storage 204 is configured to store information associated with various glasses frames. For example, information associated with a glasses frame may include measurements of various areas of the frame (e.g., bridge length, lens diameter, temple distance), renderings of the glasses frame corresponding to various (R, t) pairs, a mathematical representation of a 3D model of the glasses frame that can be used to render a glasses image for various (R, t) parameters, a price, an identifier, a model number, a description, a category, a type, a glasses frame material, a brand, and a part number. In some embodiments, the 3D model of each glasses frame includes a set of 3D points that define various locations/portions of the glasses frame, including, for example, one or more of the following: a pair of bridge points and a pair of temple bend points.

Rendering engine 212 is configured to render a 2D image of a glasses frame to be overlaid on an image. For example, the selected glasses frame may be a glasses frame for which information is stored at glasses frame information storage 204. For example, the image over which the glasses frame is to be overlaid may be stored as part of a set of images stored at images storage 202. In some embodiments, rendering engine 212 is configured to render a glasses frame (e.g., selected by a user) for each of at least a subset of a set of images. In some embodiments, rendering engine 212 is configured to transform the 3D model of the glasses frame after it has been placed onto a 3D face (e.g., the 3D model of a user's face or another 3D face), by the (R, t) pair corresponding to an image. In some embodiments, rendering engine 212 is also configured to perform occlusion culling on the transformed glasses frame using an occlusion body. The occluded glasses frame at the orientation and translation associated with the (R, t) pair excludes certain portions hidden from view by the occlusion body at that orientation/translation. The rendered glasses frame for an image should show the glasses frame at the orientation and translation corresponding to the image and can be overlaid on that image in a playback of the set of images to the user at a client device.

Figure 3:
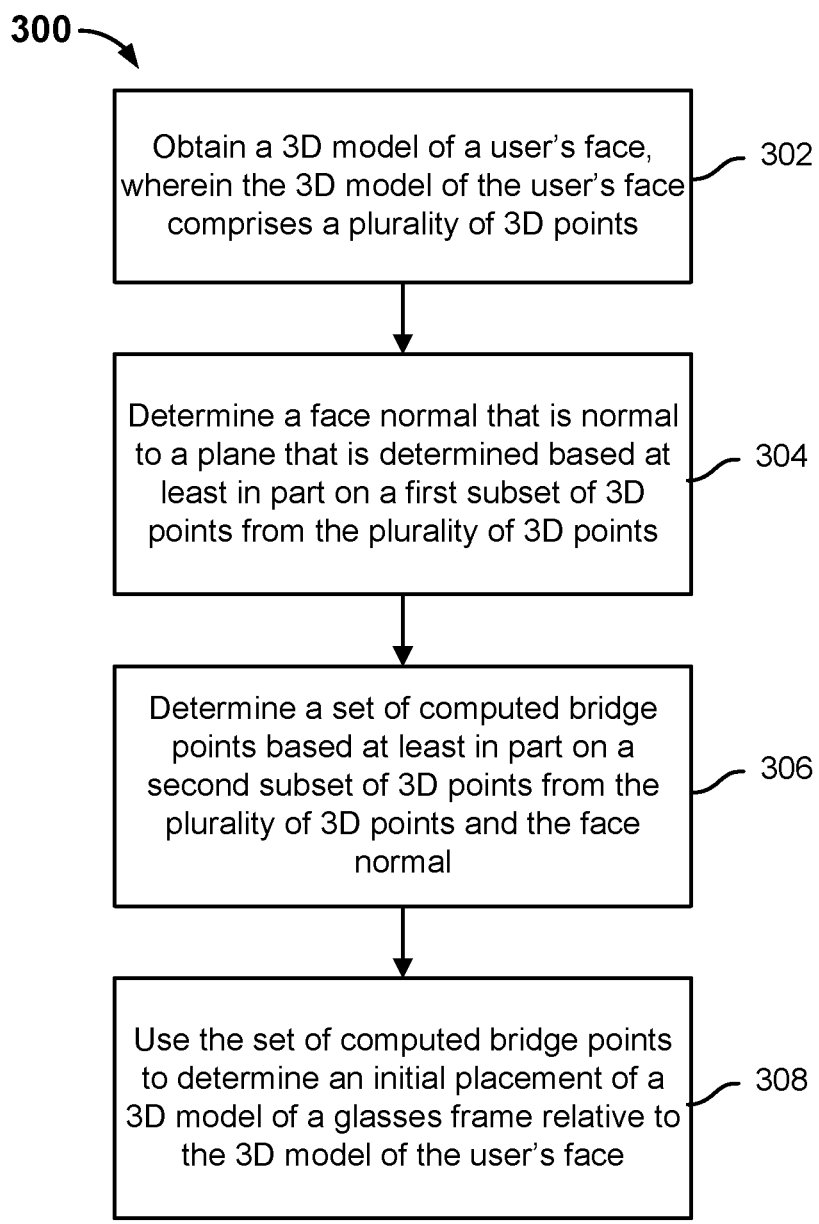
FIG. 3 is a flow diagram showing an embodiment of a process for using computed facial feature points to position a product model relative to a model of a face.

FIG. 3 is a flow diagram showing an embodiment of a process for using computed facial feature points to position a product model relative to a model of a face. In some embodiments, process 300 is implemented at system 100 of FIG. 1. Specifically, in some embodiments, process 300 is implemented at server 108 of system 100 of FIG. 1.

At 302, a 3D model of a user's face is obtained, wherein the 3D model of the user's face comprises a plurality of 3D points. In some embodiments, the 3D model of the user's face is determined from a set of images of a user's face. The set of images includes different angles and/or orientations of the user's face. In some embodiments, the 3D model of the user's face comprises reference points in 3D space that define the locations of various facial features of the user. For example, the 3D points of the 3D model of the user's face comprise the two internal eyebrow points, the two internal eye corners, the two external eye corners, the two ear junctures, the nose bridge, the cheekbones, and the nose tip.

At 304, a face normal that is normal to a plane that is determined based at least in part on a first subset of 3D points from the plurality of 3D points is determined. In some embodiments, at least three 3D points from the 3D points of the 3D model of the user's face are determined to define a plane. For example, the plane is defined using the two internal eye corner points and the two ear juncture points. For example, a plane that minimizes the distances to each of the four points (the two internal eye corner points and the two ear juncture points) is determined. A vector parallel relative to that plane is determined and is referred to as a "face normal," in various embodiments.

At 306, a set of computed bridge points is determined based at least in part on a second subset of 3D points of the plurality of 3D points and the face normal. A pair of bridge points that belongs to a set of ideal glasses points associated with a particular user is determined using the face normal and another subset of points from the 3D points of the 3D model of the user's face. In some embodiments, the distance along the face normal in between the midpoint between the two internal eyebrow points and the midpoint between the two internal eye corners of the 3D model of the user's face is determined. In some embodiments, the distance is multiplied by a predetermined coefficient to determine a bridge shift value. For example, the predetermined coefficient is 0.8. In some embodiments, the two bridge points of the set of ideal glasses points are determined by moving the two internal eye corners of the 3D model of the user's face by the bridge shift value in the direction of the camera (that was used to record the set of images from which the 3D model of the user's face was derived), along the face normal.

In some embodiments, a distance from the midpoint of the two internal eye corner points from the 3D points of the 3D model of the user's face to the midpoint of the two internal eyebrow corners from the 3D points of the 3D model of the user's face is computed. In some embodiments, the two bridge points of the set of ideal glasses points are further adjusted by moving the two computed bridge points of the set of ideal glasses points a vertical shift distance towards the internal eyebrow corner points, where the vertical shift distance is a product of the distance from the midpoint of the two internal eye corner points to the midpoint of the two internal eyebrow corner points and a (e.g., empirical) coefficient (e.g., 0.3). If this coefficient is 0, then the midpoint of the two ideal glasses bridge points will be at the same position as the midpoint of the two internal eye corners from the 3D points of the 3D model of the user's face. If this coefficient is 1.0, then the midpoint of the two ideal glasses bridge points will be at the same position as the midpoint of the two internal eyebrow corner points from the 3D points of the 3D model of the user's face. Whereas shifting the two bridge points of the set of ideal glasses points along the face normal towards the camera comprises a shift approximately along one axis (e.g., the z-axis), shifting the two bridge points of the set of ideal glasses points between the two internal eyebrow corner points and the two internal eye corner points is approximately along another axis (e.g., the y-axis).

At 308, the set of computed bridge points is used to determine an initial placement of a 3D model of a glasses frame relative to the 3D model of the user's face. In various embodiments, a glasses frame is selected (e.g., by a user to virtually try-on). In various embodiments, a 3D model of the glasses frame comprises a set of 3D points that define the locations of various points of the glasses frame. For example, the 3D model of the glasses frame comprises two bridge points and two temple points associated with the glasses frame. The 3D model of a glasses frame is placed onto the 3D model of the user's face based at least in part on aligning the set of computed bridge points of the set of ideal glasses associated with the user and the bridge points of the 3D model of the glasses frame. In some embodiments, the set of computed bridge points of the set of ideal glasses associated with the user are aligned with the bridge points of the 3D model of the glasses frame such that the two sets of bridge points share the same midpoint.

Figure 4:
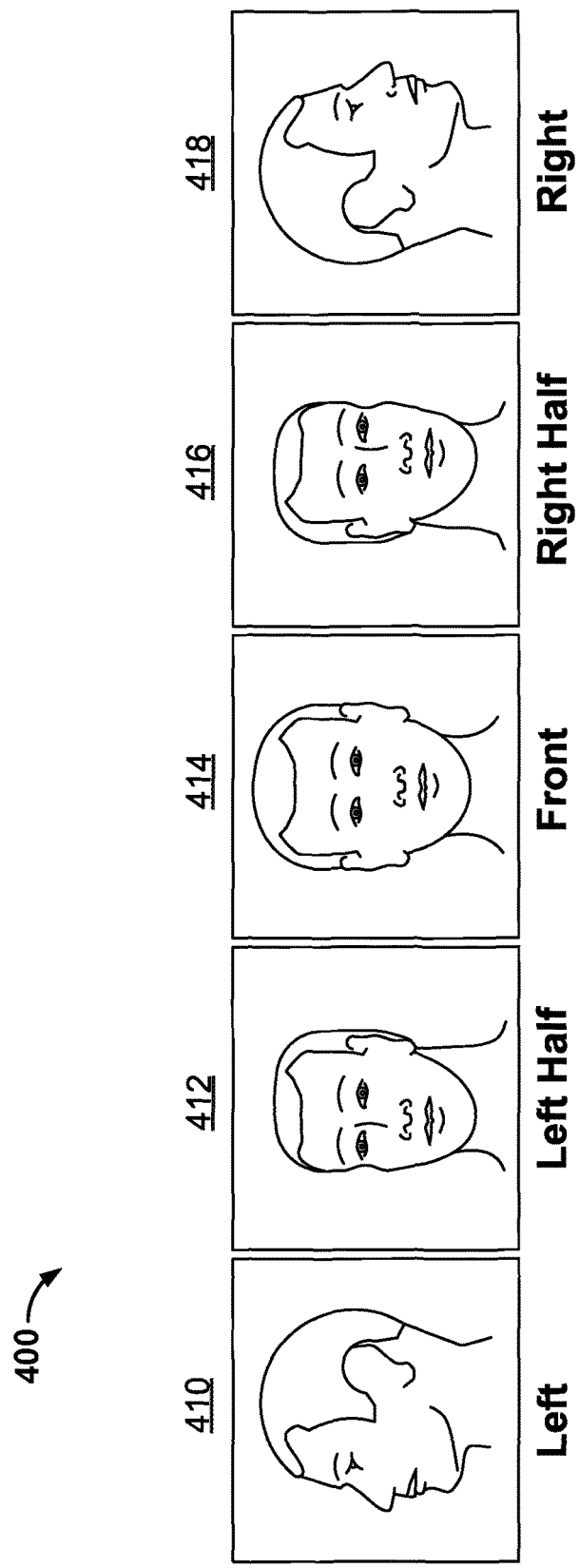
FIG. 4 shows an example of received images and/or video frames of the user's face and head.

FIG. 4 shows an example of received images and/or video frames of the user's face and head. Set of images 400 shows various orientations of a user's face (images 410-418). For example, the set of images is captured by a camera that the user is in front of. The user is instructed to turn his head as the camera captures video frames of the user's head. In some embodiments, the user is instructed to look left and then look right. In some embodiments, the user is shown a video clip or an animation of a person turning their head and instructed to do the same. The number of video frames captured can vary. The camera can be instructed by a processor to capture the user's head with a continuous video or snapshots (for example, series of images with a delay between captures). In some embodiments, the camera captures images of the user's head in a continuous capture mode, where the frame rate can be lower than capturing a video. The processor can be local or remote, for example on a server. Set of images 400 has already been processed (e.g., redundant and/or otherwise undesirable images were removed from the set) and different images in the set have been identified to represent a different orientation of the user's face. Set of images 400 can be used to determine a 3D model of the user's face on which a 3D model of a selected glasses frame is to be placed/fitted, as will be described in further detail below.

FIGS. 5A and 5B show an example of reference points obtained from a set of images of a user's face. The reference points define the locations of various facial features and are used to generate a 3D model of the user's face. FIG. 5A shows image 500, where the user is in the front orientation and reference point 502 is at the internal corner of the user's right eye, which is assigned coordinates (x0, y0). Reference points of the eye may also include internal left eye point 504 with coordinates (x1, y1) and external left eye point 506 with coordinates (x2, y2). From the two reference points of internal right eye 502 and internal left eye 504, bridge distance 508 can be determined. In some embodiments, a lens distance can be determined using internal left eye point 504 and external left eye point 506 (resulting in distance 510). FIG. 5B shows another image with another orientation of the user's face, right profile 520, with external right eye reference point 522 with coordinates (y4, z4) and top point where the helix joins the head point 524 with coordinates (y3, z3). From the profile pictures, the z coordinate can be added to the 3D model of the user's face. From the 2D video frames of the user's face, a 3D model of the user's face can be determined.

FIG. 5C shows an example 3D model of a user's face. 3D model of a user's face 550 shows a set of 3D points. In some embodiments, reference points from the 2D images (e.g., such as those shown in FIGS. 5A and 5B) are combined to make 3D model of a user's face 550. The corresponding reference points are combined to make a set of (x, y, z) coordinates representing the position of each of the reference points (e.g., locations of facial features) on the user's face/head. For example, the (x, y) coordinates of the outside corner of the right eye 512 from the front orientation video frame 500 of FIG. 5A could be combined with the z coordinate of the outside right eye reference point 522 in the right orientation image/video frame 520 of FIG. 5B to obtain the reference point 544 with coordinates (x4, y4, z4). 3D model of a user's face 550 includes 3D points (corresponding (x, y, z) coordinates) including internal eyebrow points 548 and 552, external eye corners 544 and 562, internal eye corners 558 and 560, ear junctures 554 and 546, cheekbones 566 and 568, and nose tip 564.

Figure 6:
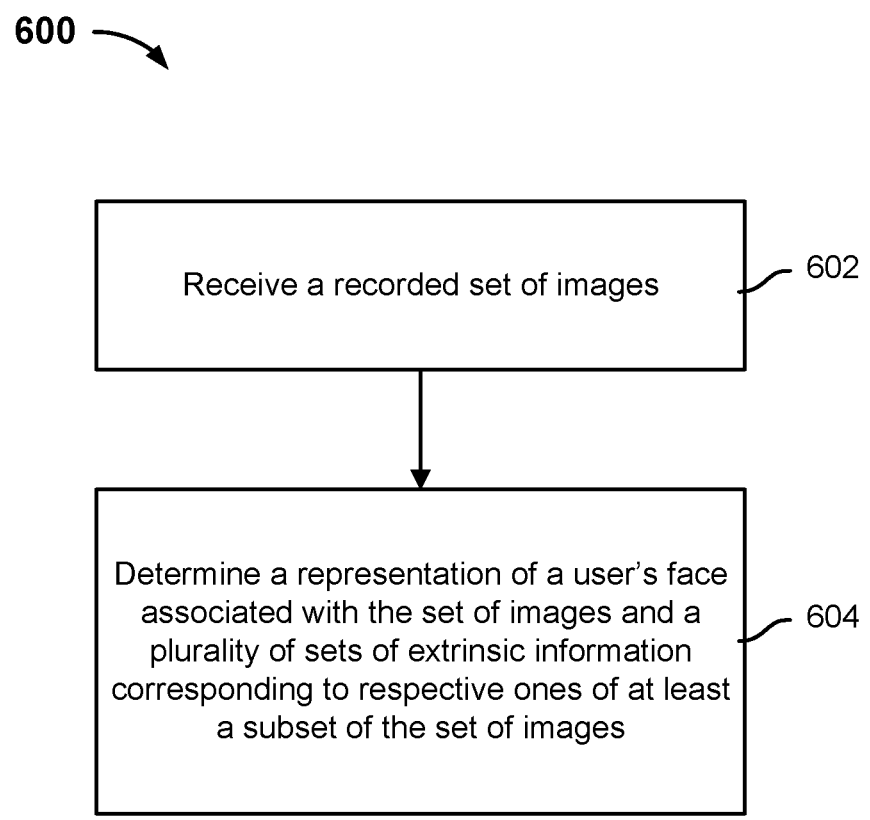
FIG. 6 is a flow diagram showing an embodiment of a process for processing a set of images.

FIG. 6 is a flow diagram showing an embodiment of a process for processing a set of images. In some embodiments, process 600 is implemented at system 100 of FIG. 1. Specifically, in some embodiments, process 600 is implemented at server 108 of system 100 of FIG. 1.

Process 600 is an example process for determining sets of extrinsic information corresponding to images of a user's face, where a set of extrinsic information corresponding to a particular image describes the orientation (e.g., the rotation and translation) of the user's face in that image.

At 602, a recorded set of images is received. In various embodiments, the set of images corresponds to a recorded video or a series of snapshots of a user's face turned in different orientations. As such, each image of the set is associated with an orientation of the user's face in that image.

At 604, a representation of a user's face associated with the set of images and a plurality of sets of extrinsic information corresponding to respective ones of at least a subset of the set of images are determined. In some embodiments, the representation of the user's face is a model in 3D space and is referred to as an M matrix. In some embodiments, the M matrix is determined based at least in part on measured reference points of one or more features associated with the user's face as described above. For example, the M matrix comprises the 3D points that are described in FIG. 5C above. In some embodiments, the extrinsic set of information associated with an image of the set of images is referred to as an (R, t) pair. An (R, t) pair is determined for each of at least a subset of the set of images so each image corresponds to a respective (R, t) pair that is associated with the orientation of the user's face in that image.

In some embodiments, an optimal M matrix is determined for the set of images and an optimal (R, t) pair is determined for each of at least a subset of the set of images. In a first example, a parameter search is used to perform iterative computations until the optimal M and set of (R, t) pairs are found. For example, a distribution of M matrices (e.g., that have been predetermined based on known face samples or generated on the fly) corresponding to the set of images and a distribution of (R, t) pairs corresponding to each image of the set of images are determined, and a combination of matrix M and (R, t) pairs that best describes at least a subset of the set of images is selected. In another example, a bundle adjust technique is used and the bundle adjust technique may treat the M and the set of (R, t) pairs as unknowns in an optimization problem and iteratively test out various combinations of M matrices and (R, t) pairs until an M and a set of (R, t) pairs are found that best match the set of images. For example, the optimal M matrix and an optimal (R, t) pair corresponding to an image result in the minimum reprojection error of any other combination of an M matrix and an (R, t) pair and therefore the combination of this M matrix and this (R, t) pair best matches the image corresponding to the (R, t) pair. While one M matrix is determined for the set of images, a set of (R, t) pairs, each corresponding to respective ones of at least a subset of the set of images, is determined.

In some embodiments, a set of intrinsic information associated with the camera associated with the set of images is also determined via iterative computations. In some embodiments, the set of intrinsic information associated with the camera is predetermined.

Figure 7:
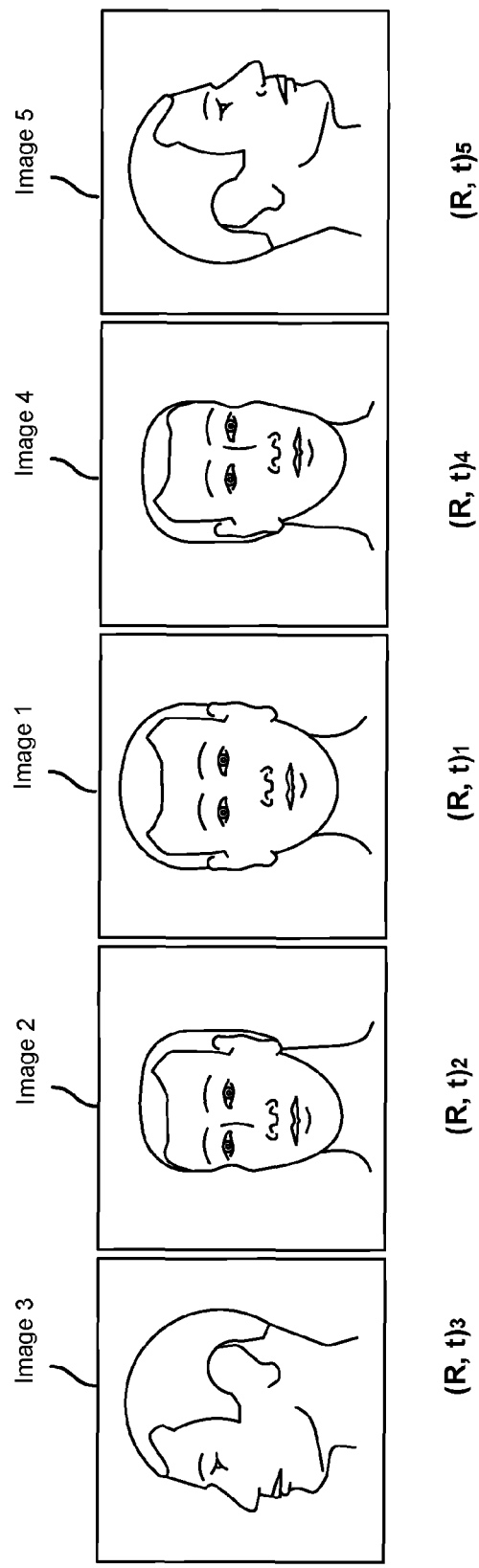
FIG. 7 is a diagram showing several images included in a set of images.

FIG. 7 is a diagram showing several images included in a set of images. In the example, Images 1, 2, 3, 4, and 5 are included in a recorded set of images of a user's face at various different orientations relative to the camera. As described above, a set of extrinsic information (e.g., an (R, t) pair) that describes the orientation and translation of the user's face in an individual image is determined for that image. As shown in the example, each image is identified by a number 1 through 5 and has a corresponding (R, t) pair, which includes the number associated with the image as its subscript (e.g., $(R, t)_1$ pair corresponds to Image 1, $(R, t)_2$ pair corresponds to Image 2). For example, $(R, t)_1$ pair may be used to transform the 3D model of the user's face in the set of images (e.g., the M matrix) in 3D space into the orientation and translation of the user's face that is shown in Image 1. Furthermore, to obtain the projection of the 3D user's face oriented/translated using $(R, t)_2$ onto the 2D surface of the camera associated with the set of images, $I \times (R_2 \times M + t_2)$ may be computed, where the I matrix corresponds to the set of intrinsic information determined for the camera.

Figure 8:
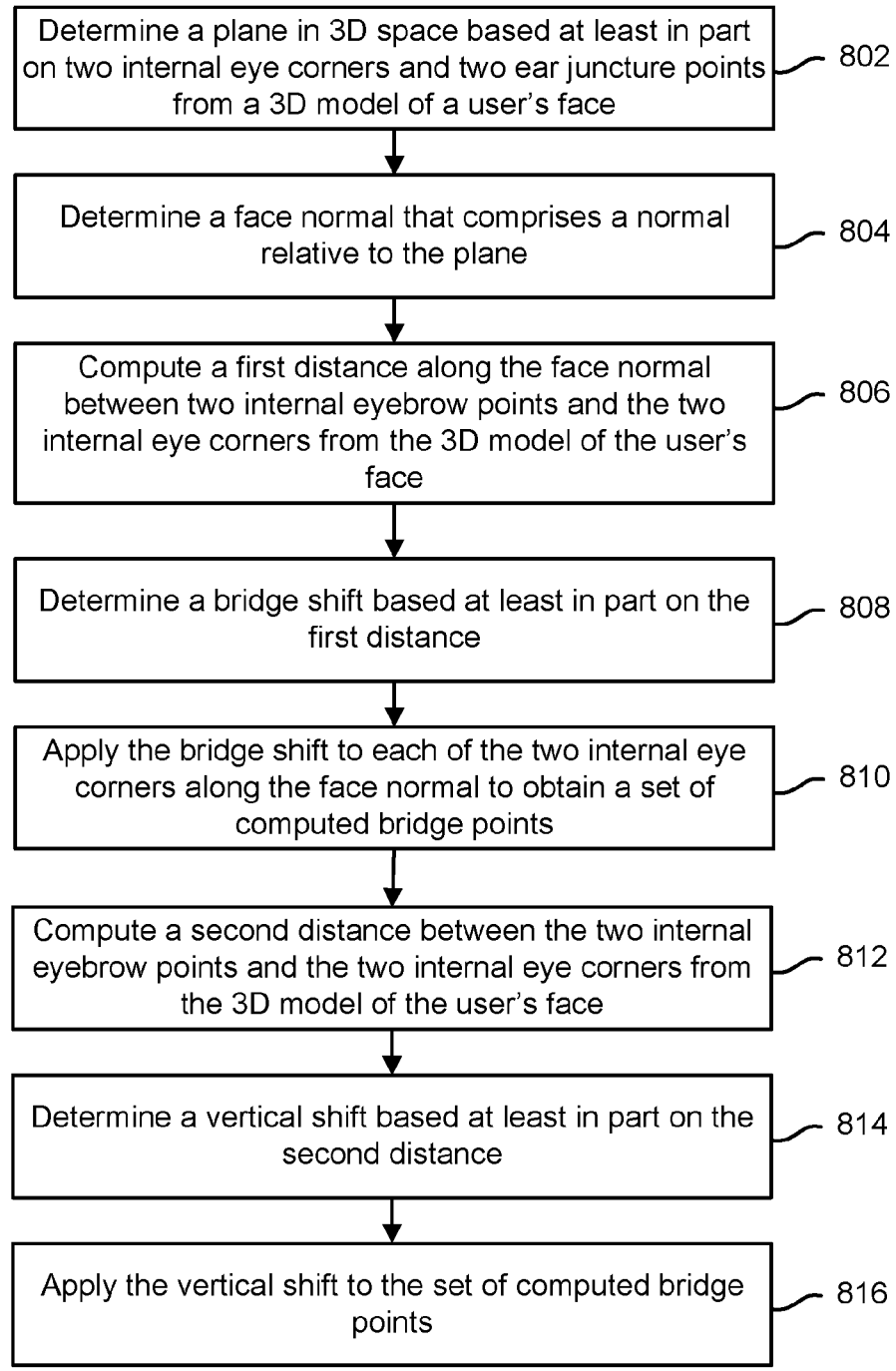
FIG. 8 is a flow diagram showing an example process for determining a set of computed bridge points to be used to determine an initial placement of a 3D model of a glasses frame relative to a 3D model of a user's face.

FIG. 8 is a flow diagram showing an example process for determining a set of computed bridge points to be used to determine an initial placement of a 3D model of a glasses frame relative to a 3D model of a user's face. In some embodiments, process 800 is implemented at system 100 of FIG. 1. Specifically, in some embodiments, process 800 is implemented at server 108 of system 100 of FIG. 1. In some embodiments, steps 302, 304, and 306 of process 300 of FIG. 3 can be implemented using process 800.

At 802, a plane in 3D space is determined based at least in part on two internal eye corners and two ear juncture points from a 3D model of a user's face. For example, the plane can be determined from the four 3D points of the two internal eye corners and the two ear juncture points from a 3D model of a user's face by defining a plane in 3D space that minimizes the distance between the plane and each of these four points. The plane can be determined using the four 3D points by other techniques as well.

At 804, a face normal that comprises a normal relative to the plane is determined. A parallel vector that is relative to this plane is determined and sometimes referred to as the "face normal" (because the plane is approximately perpendicular to the surface of the user's face).

At 806, a first distance along the face normal between two internal eyebrow points and two internal eye corners from the 3D model of the user's face is determined. In some embodiments, the distance along the face normal between the two internal eyebrow points and two internal eye corners is measured as the distance between the midpoint of the two internal eyebrow points and the midpoint of the two internal eye corners. This distance intuitively estimates how far the user's eyebrows (and hence glasses frame) should be positioned relative to the user's two internal eye corners. This distance is sometimes referred to as the "eyebrow z-delta" because the face normal is, in some embodiments, along the z-axis.

At 808, a bridge shift is determined based at least in part on the first distance. In some embodiments, a bridge shift is a value that is determined by multiplying the eyebrow z-delta by a predetermined coefficient. For example, the predetermined coefficient is a value (e.g., 0.8) that is close to 1.0.

At 810, the bridge shift is applied to each of the two internal eye corners along the face normal to obtain a set of computed bridge points. As mentioned above, in various embodiments, the two computed bridge points are part of a set of ideal glasses 3D points that are derived for the user whose face is featured in the set of images from which the 3D model of the user's face was determined. The two bridge points of the set of ideal glasses 3D points are determined by moving the two internal eyebrow points from the 3D model of the user's face toward the camera (that was used to generate the set of images) along the face normal by the bridge shift value. The two computed bridge points are then stored in the set of ideal glasses 3D points associated with the user. As will be described in further detail below, the two computed bridge points will be used to determine at least an initial placement of the 3D model of a (e.g., user selected) glasses frame over the 3D model of the user's face.

At 812, a second distance is computed between the two internal eyebrow points and the two internal eye corners. In some embodiments, this second distance between the two internal eyebrow points and two internal eye corners is measured as the distance between the midpoint of the two internal eyebrow points and the midpoint of the two internal eye corners. In some embodiments, this second distance is approximately along the y-axis.

At 814, a vertical shift is determined based at least in part on the second distance. In some embodiments, a vertical shift value is determined as a product of the second distance and a (e.g., empirical) coefficient (e.g., 0.3).

At 816, the vertical shift is applied to the set of computed bridge points. The set of computed bridge points is further adjusted such that they are moved by the vertical shift towards the two internal eyebrow points.

In various embodiments, in addition to the set of (two) bridge points that are computed using a process such as process 800, the set of ideal glasses 3D points associated with a particular user further includes the original two ear junctures points (e.g., points 546 and 554 of FIG. 5C) of the 3D model of that user's face, which are sometimes referred to as the (two) temple bend points of the set of ideal glasses 3D points.

Figure 9:
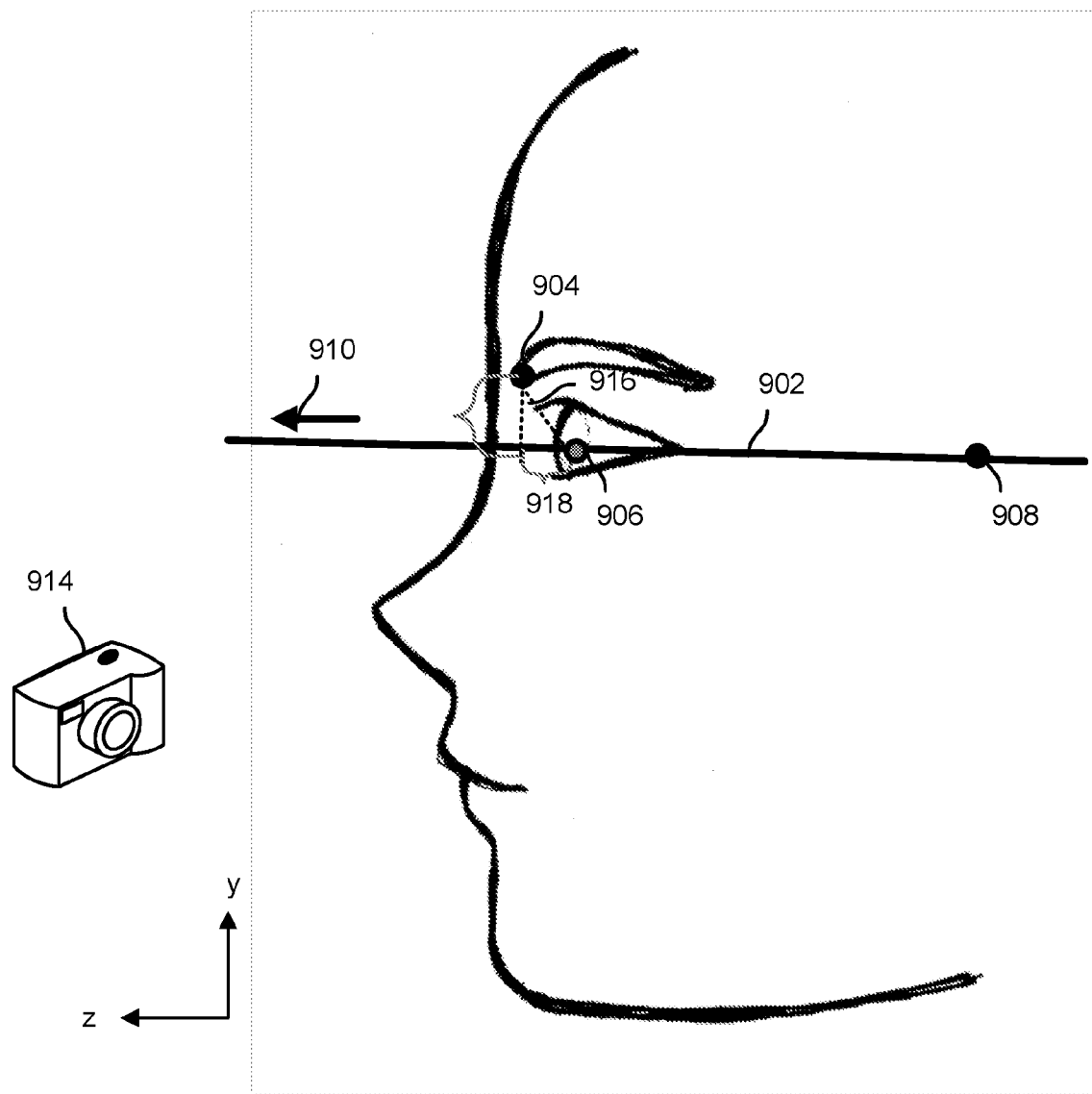
FIG. 9 is an example of determining a computed bridge point.

FIG. 9 is an example of determining a computed bridge point. Process 800 of FIG. 8 is applied in the example of FIG. 9 in determining a computed bridge point of a set of ideal glasses 3D points associated with a user. The example of FIG. 9 shows a profile of the left side of the user's face, for illustrative purposes. In this profile of the left side of the user's face, the user's left internal eye corner point 906, which is part of a 3D model of the user's face, is obscured by the user's left eye and is denoted by a grey circle, left ear juncture point 908, which is also part of a 3D model of the user's face, is visible and is denoted with a black circle, and left eye brow point 904, which is also part of a 3D model of the user's face, is visible and is denoted with a black circle. Plane 902 in 3D space is determined by the four points of the user's left internal eye corner point 906, the user's left ear juncture point 908, and the user's right internal eye corner point (not shown) and the user's right ear juncture point (not shown) that are also part of the 3D model of the user's face. For example, while a plane in 3D space is defined using three points, plane 902 can be determined using the four points as the plane with the minimum distance to each of the four points. Face normal 910, which is approximately along the z-axis, is then determined relative to plane 902 as a vector that is parallel to plane 902. Distance 916 represents the distance between the midpoint of internal eye corner 906 and the user's right internal eye corner (not shown) and the midpoint between internal eyebrow point 904 and the user's right internal eyebrow point (not shown). Eyebrow z-delta 918 is the projection or portion of distance 916 that is along face normal 910. A bridge shift value is a distance that is determined as a function of at least eyebrow z-delta 918 and a predetermined coefficient (e.g., the bridge shift is a product of eyebrow z-delta 918 and the predetermined coefficient). To determine a set of bridge points of the set of ideal glasses, each of the two internal eye corner points of the 3D model of the user's face is moved the distance of the bridge shift towards camera 914 along face normal 910. Furthermore, in some embodiments, the set of bridge points of the set of ideal glasses is further moved a vertical shift distance along the vector that is determined as being parallel to the distance between the midpoint of internal eye corner 906 and the user's right internal eye corner (not shown) and the midpoint of internal eyebrow point 904 and the user's right internal eyebrow point (not shown). In some embodiments, the vertical shift is a function (e.g., a product) of a predetermined coefficient (e.g., 0.3) and the distance between the midpoint of internal eye corner 906 and the user's right internal eye corner (not shown) and the midpoint of internal eyebrow point 904 and the user's right internal eyebrow point (not shown).

Figure 10:
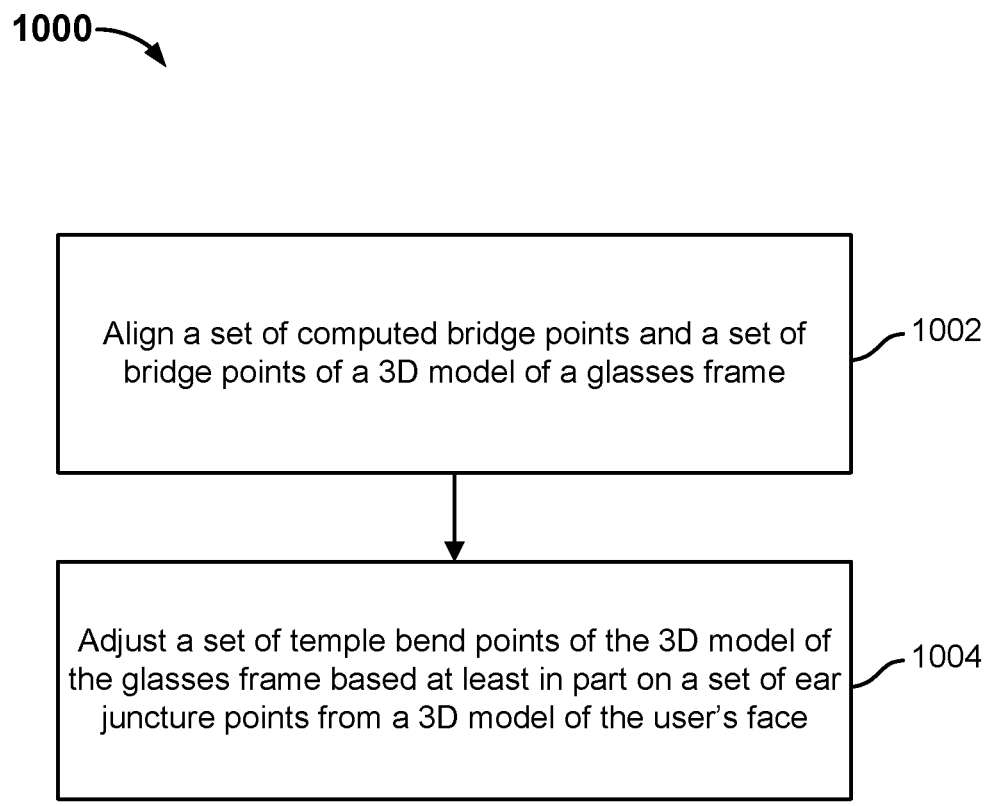
FIG. 10 is a flow diagram showing an example process for determining an initial placement between a 3D model of a glasses frame relative to a 3D model of a user's face using a set of computed bridge points.

FIG. 10 is a flow diagram showing an example process for determining an initial placement between a 3D model of a glasses frame relative to a 3D model of a user's face using a set of computed bridge points. In some embodiments, process 1000 is implemented at system 100 of FIG. 1. Specifically, in some embodiments, process 1000 is implemented at server 108 of system 100 of FIG. 1. In some embodiments, step 308 of process 300 of FIG. 3 can be implemented using process 1000.

After the set of computed bridge points associated with a user has been determined by a process such as process 800 of FIG. 8, a process such as process 1000 can be used to determine an initial placement of a 3D model of a glasses frame relative to a 3D model of that user's face using the set of computed bridge points.

At 1002, a set of computed bridge points is aligned with a set of bridge points of a 3D model of a glasses frame. A bridge line is defined as a line that passes through a pair of bridge points. The bridge line of the set of computed bridge points (e.g., that were computed by a process such as process 800 of FIG. 8) is aligned with the bridge line of the set of bridge points of a 3D model of a glasses frame such that the midpoint of each of the two bridge lines are in (substantially) the same position. For example, the glasses frame may be selected by a user (e.g., at a user interface) as being a glasses frame that the user wishes to virtually try-on.

At 1004, a set of temple bend points of the 3D model of the glasses frame is adjusted based at least in part on a set of ear juncture points from a 3D model of the user's face.

After step 1002, the bridge points of the 3D model of the glasses frame are fixed such that it is only allowed to rotate about the aligned bridge lines, which form an axis. The 3D model of the glasses frame is then rotated about this axis such that the set of temple bend points of the 3D model of the glasses frame are aligned (e.g., within a predetermined threshold) with the set of ear juncture points of the 3D model of the user's face. It is possible that the set of temple bend points of the 3D model of the glasses frame are not perfectly aligned with the set of ear juncture points of the 3D model of the user's face since the distance between ear junctures and temple bend points are almost always different.

As described above, the four 3D points that include the set of computed bridge points (that are determined by a process such as process 800 of FIG. 8) associated with a user and the original ear juncture points of the 3D model of the user's face (e.g., points 546 and 554 of FIG. 5C) are sometimes referred to as a set of ideal glasses 3D points associated with the user.

Figure 11:
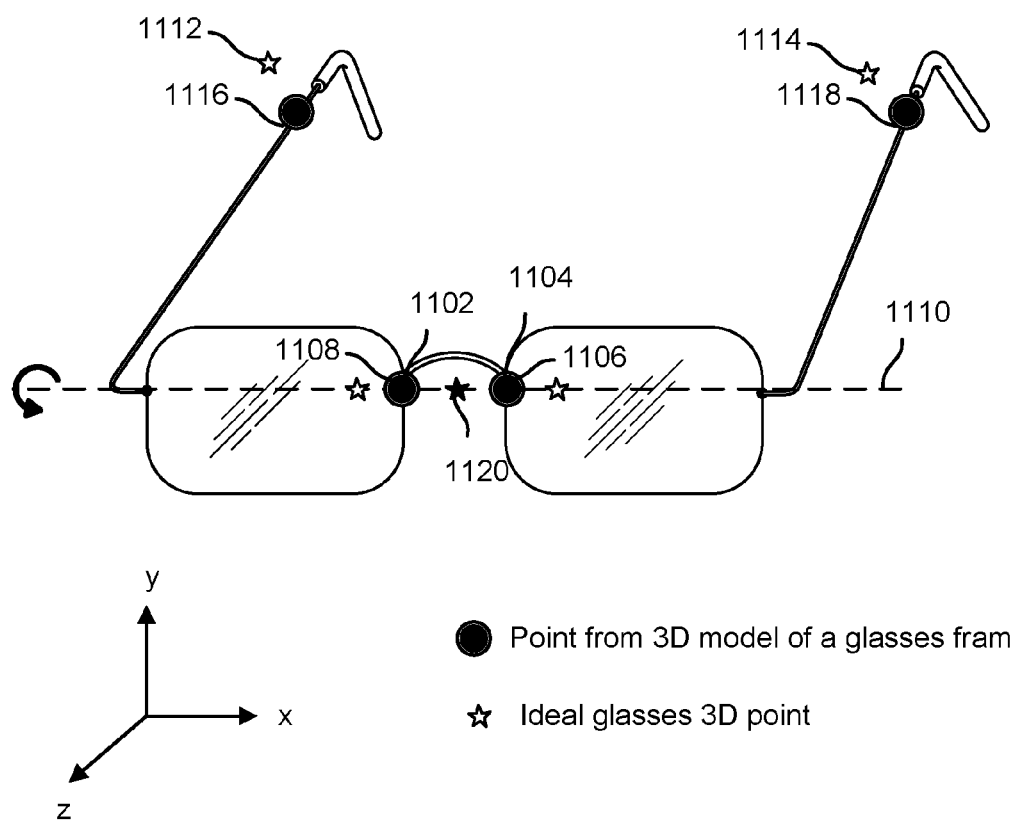
FIG. 11 is a diagram showing an example of determining an initial placement of a 3D model of a glasses frame.

FIG. 11 is a diagram showing an example of determining an initial placement of a 3D model of a glasses frame. Process 1000 of FIG. 10 is applied in the example of FIG. 11 to determine the initial placement of a 3D model of a glasses frame to a set of ideal glasses 3D points associated with a user. A stored 3D model of a glasses frame comprises at least bridge points 1108 and 1106 and temple bend points 1116 and 1118. To determine the initial placement, first, bridge points 1102 and 1104 of the set of ideal glasses 3D points are aligned with bridge points 1108 and 1106 of the 3D model of the glasses frame such that the midpoints of the two bridge lines are in the same position, which is denoted by location 1120. After the alignment, bridge points 1108 and 1106 of the 3D model of the glasses frame are fixed such that the model can only rotate around axis 1110, which for purposes of illustration, is shown as an extension of the aligned bridge lines. The 3D model of the glasses frame is then rotated about axis 1110 until temple bend points 1116 and 1118 of the 3D model of the glasses frame are aligned with temple bend points 1112 and 1114 of the set of ideal glasses 3D points (which, in some embodiments, are equivalent to the ear juncture points of the 3D model of the user's face). In some embodiments, temple bend points 1116 and 1118 of the 3D model of the glasses frame are aligned with temple bend points 1112 and 1114 of the set of ideal glasses 3D points in the event that the distance between temple bend point 1116 of the 3D model of the glasses frame to temple bend point 1112 of the set of ideal glasses 3D points and the distance between temple bend point 1118 of the 3D model of the glasses frame to temple bend point 1114 of the set of ideal glasses 3D points are minimized.

In some embodiments, the initial placement of the 3D model of the glasses frame may be used to render 2D images of the glasses frame corresponding to various images of the user's face. In some embodiments, the initial placement of the 3D model of the glasses frame is further modified based on the techniques as described below with FIGS. 12-17.

Figure 12:
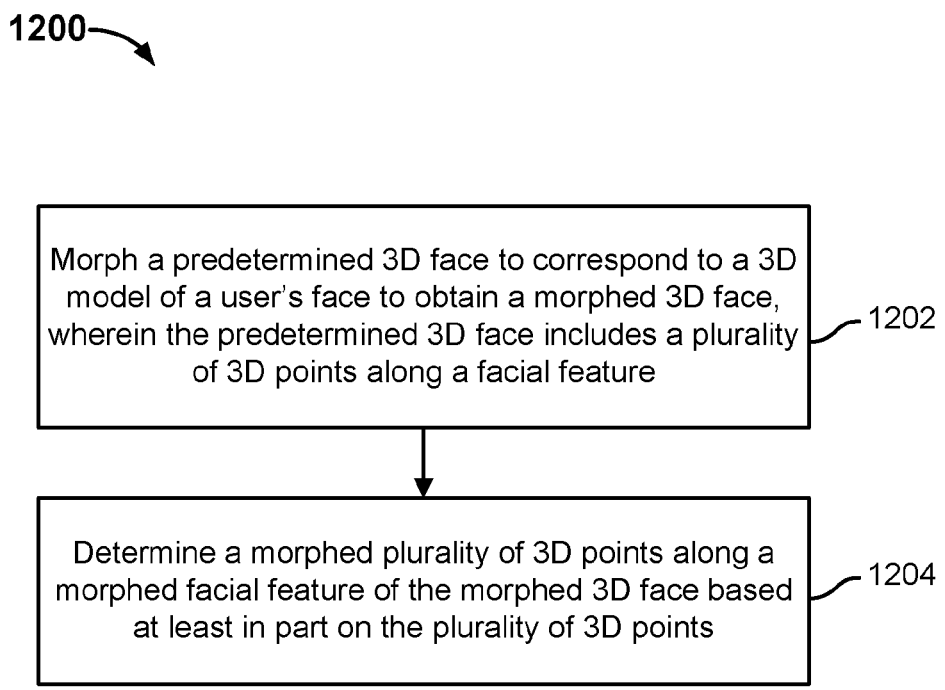
FIG. 12 is a flow diagram showing an example process for determining a plurality of 3D points along a facial feature of a morphed predetermined 3D face.

FIG. 12 is a flow diagram showing an example process for determining a plurality of 3D points along a facial feature of a morphed predetermined 3D face. In some embodiments, process 1200 is implemented at system 100 of FIG. 1. Specifically, in some embodiments, process 1200 is implemented at server 108 of system 100 of FIG. 1.

At 1202, a predetermined 3D face is morphed to correspond to a 3D model of a user's face to obtain a morphed 3D face, wherein the predetermined 3D face includes a plurality of 3D points along a facial feature. In various embodiments, a predetermined 3D face comprises a 3D model of a generic face. For example, the predetermined 3D face may be determined from a plurality of historical user faces. For example, the predetermined 3D face is a mesh model that comprises numerous polygons that define the shape of a human head and also the shapes of facial features, including one or more of a nose, eyebrows, eyes, lips, and cheekbones. Prior to the morphing, a known set of 3D points defines the shape of a particular facial feature on the predetermined 3D face. In various embodiments, the particular facial feature is the nose and the set of 3D points defines the nose curvature.

Prior to morphing the predetermined 3D face, a set of (e.g., of 12) 3D points along various locations of the nose curvature of the predetermined 3D face is (e.g., manually) selected. The 3D coordinates of each of such points along the nose curvature of the predetermined 3D face, prior to morphing, are recorded.

In some embodiments, morphing the predetermined 3D face to correspond to the 3D model of a user's face comprises moving the locations of at least some facial features on the predetermined 3D face to match the corresponding 3D points associated with various facial features of the 3D model of the user's face. For example, the internal eyebrow points of the predetermined 3D face are moved to match the locations of the internal eyebrow points of the 3D model of the user's face, the internal eye corners of the predetermined 3D face are moved to match the locations of the internal eye corners of the 3D model of the user's face, the external eye corners of the predetermined 3D face are moved to match the locations of the external eye corners of the 3D model of the user's face, and so forth. As different locations/vertices of at least some facial features on the predetermined 3D face are morphed/moved to match the corresponding 3D points associated with various facial features of the 3D model of the user's face, the neighborhood vertices of the morphed facial features of the predetermined 3D face are pulled along with those facial features. For example, morphing a left cheekbone point of the predetermined 3D face to match a left cheekbone point of the 3D model of the user's face pulls at least a portion of the predetermined 3D face's left cheek with the morphed left cheekbone.

In some embodiments, the predetermined 3D face after morphing, which is also sometimes referred to as the "morphed 3D face," can be used as the occlusion body in the process of rendering the fitted 3D model of the glasses frame into 2D images corresponding to respective images, as will be described in further detail below.

At 1204, a morphed plurality of 3D points along a morphed facial feature of the morphed 3D face is determined based at least in part on the plurality of 3D points. By virtue of morphing the predetermined 3D face to correspond to the 3D model of the user's face, the facial features of the morphed 3D face have likely been moved (in 3D space) from their original positions on the predetermined 3D face. As such, after the morphing is completed, the set of 3D points along the nose curvature of the morphed predetermined 3D face are now in different locations in 3D space than they were prior to the morphing of the predetermined 3D face. The set of 3D points along the morphed nose of the morphed predetermined 3D face is sometimes referred to as a set of morphed 3D points. In some embodiments, the set of morphed 3D points will be used to modify the initial placement of the 3D model of the glasses frame relative to the 3D model of the user's face.

Figure 13:
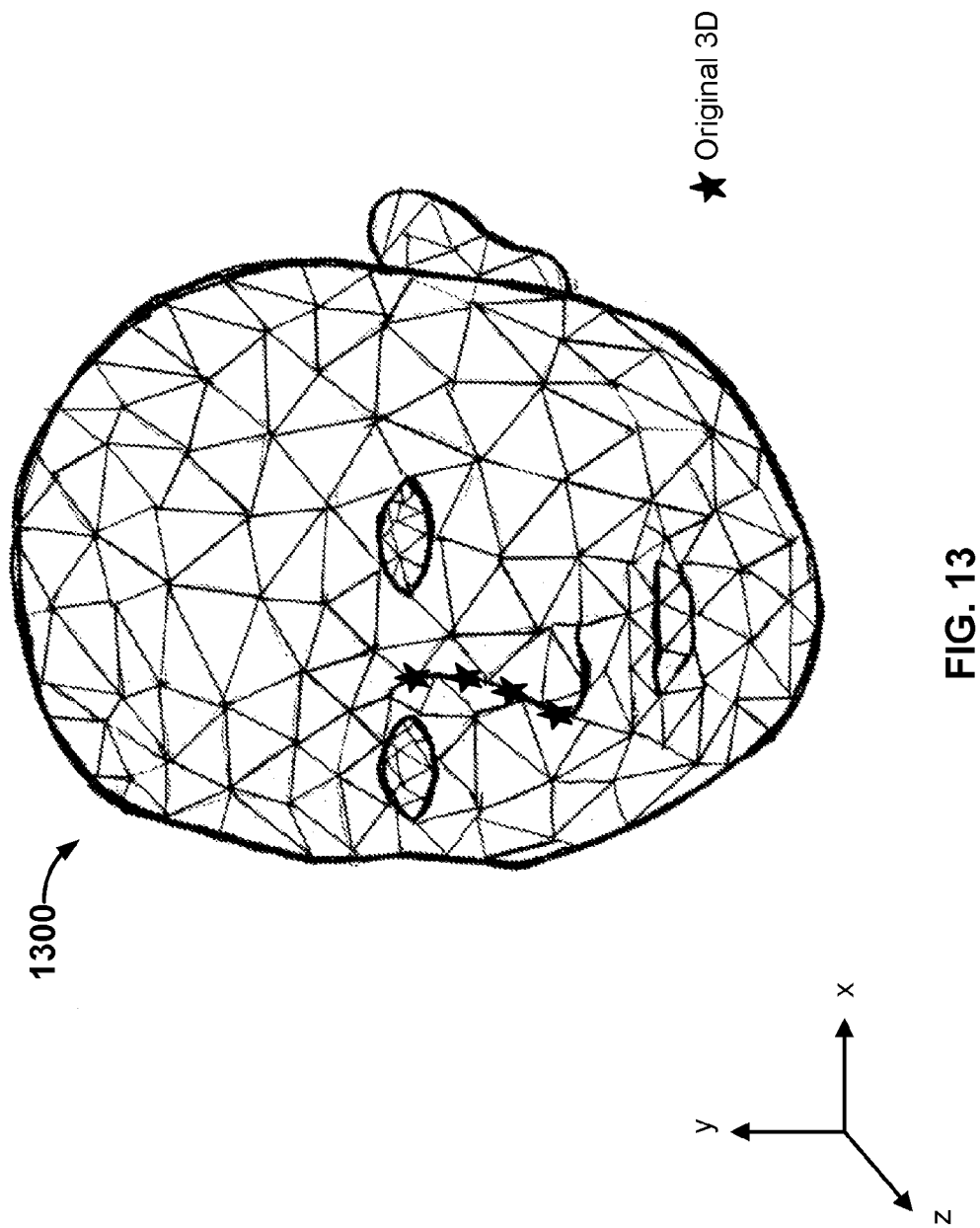
FIG. 13 is a diagram showing an example of a visualization of a predetermined 3D face in 3D space.

FIG. 13 is a diagram showing an example of a visualization of a predetermined 3D face in 3D space. In some embodiments, the predetermined 3D face comprises an .obj file. In the example of FIG. 13, predetermined 3D face 1300 includes triangular-shaped polygons that define the shapes of the facial features of the predetermined 3D face. While in the example of FIG. 13, predetermined 3D face 1300 includes triangular-shaped polygons, in actual implementation, a predetermined 3D face may include polygons of other shapes and/or other numbers of vertices as well. For example, the generic face can be predetermined and/or constructed from various previous users. In the example of FIG. 13, each 3D point that is selected along the original shape of the nose curvature portion of the predetermined 3D face 1300, prior to being morphed to correspond to a 3D model a user's face, is shown by a black star in the diagram.

Figure 14:
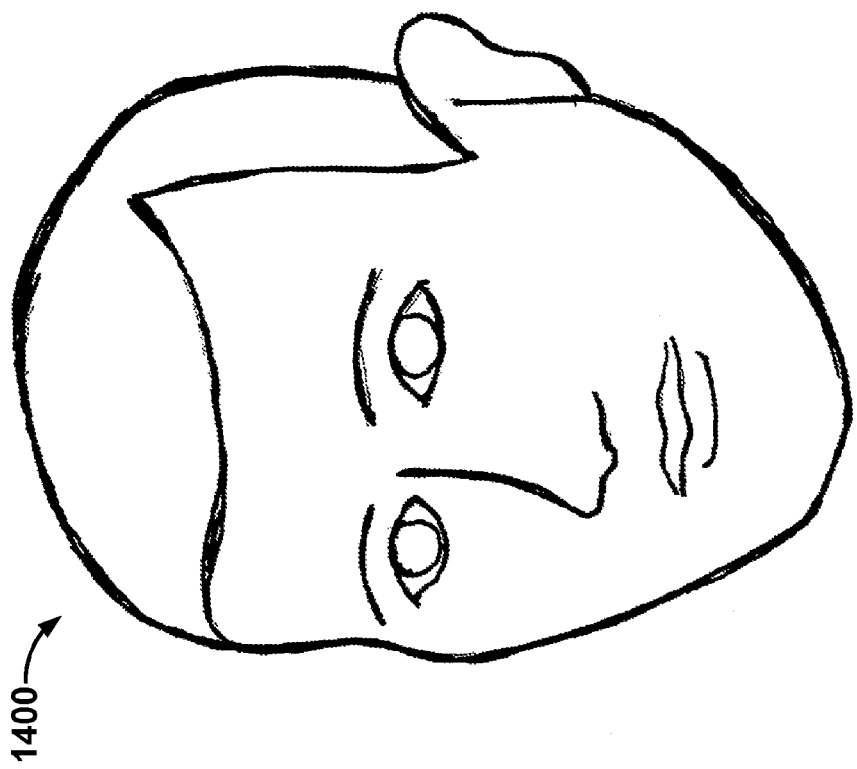
FIG. 14 is a diagram showing an example of a visualization of a 3D model of a user's face in 3D space.

FIG. 14 is a diagram showing an example of a visualization of a 3D model of a user's face in 3D space. For example, 3D model of a user's face 1400 was constructed using a set of images (Images 1 through 5) of FIG. 7. For example, 3D model of a user's face 1400 was determined based on a set of reference points associated with features on the user's face from the set of images. Examples of reference points include endpoints of the user's internal eyebrow points, external eye corners, internal eye corners, ear junctures, cheekbones, and nose tip.

Figure 15:
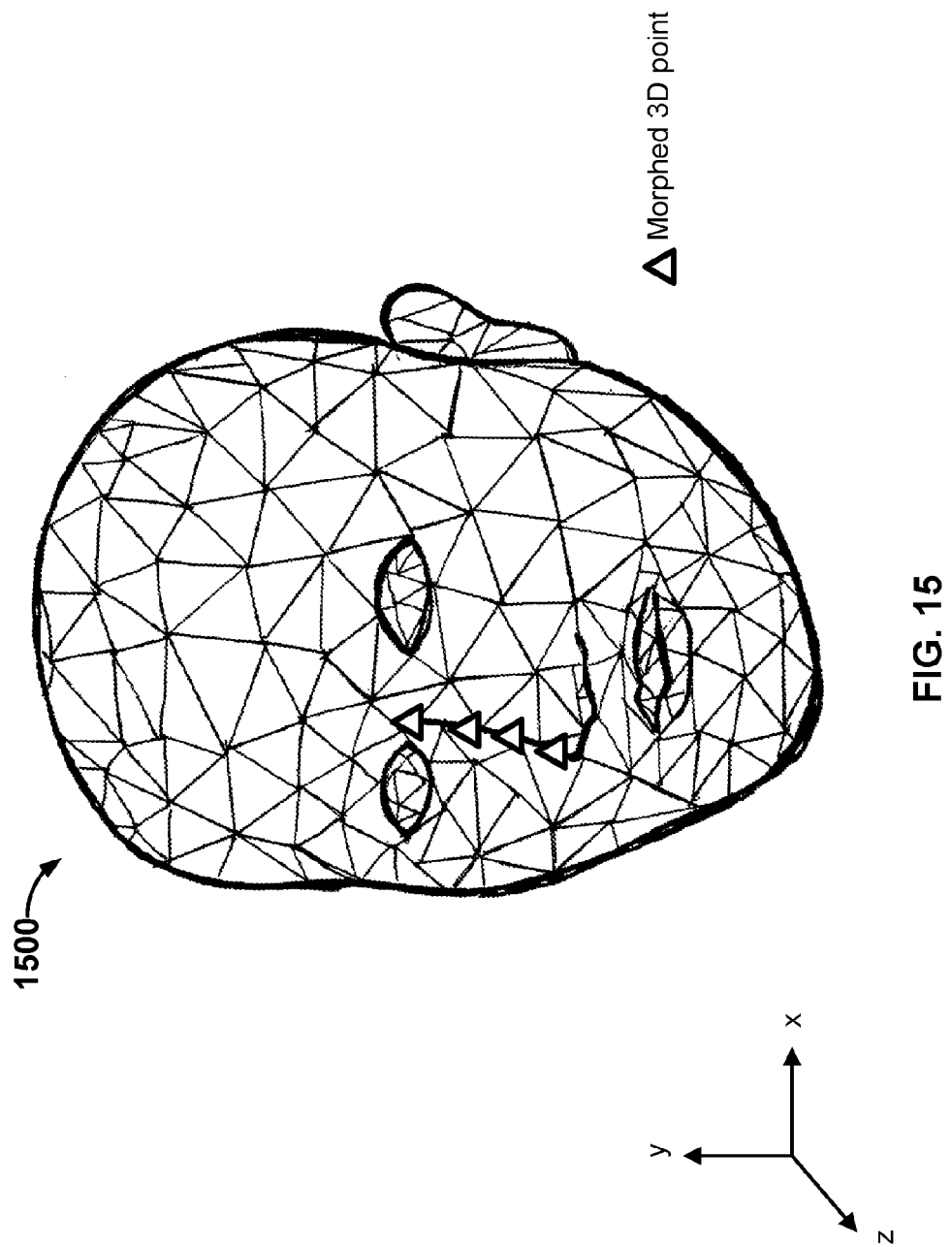
FIG. 15 is a diagram showing an example of a visualization of a morphed 3D face in 3D space.

FIG. 15 is a diagram showing an example of a visualization of a morphed 3D face in 3D space. In some embodiments, a morphed 3D face is morphed to match a 3D model of a user's face. In the example of FIG. 15, morphed 3D face 1500 was the product of morphing predetermined 3D face 1300 of FIG. 13 to match 3D model of a user's face 1400 of FIG. 14. Morphing predetermined 3D face 1300 of FIG. 13 to match 3D model of a user's face 1400 of FIG. 14 includes, for example, moving the coordinates of the vertices of the polygons of predetermined 3D face 1300 of FIG. 13 to corresponding locations on 3D model of a user's face 1400 of FIG. 14 in 3D space. As such, morphed 3D face 1500 includes polygons of predetermined 3D face 1300 of FIG. 13 that have been mapped to the surface of the user's face 1400 of FIG. 14. As a result of morphing the predetermined 3D face, the previously selected 3D points along the nose curvature have been moved to new locations in 3D space (i.e., new 3D (x, y, z) coordinates). In the example of FIG. 15, each morphed 3D point along the morphed shape of the nose curvature portion of morphed 3D face 1500 is shown by a white triangle in the diagram.

Figure 16:
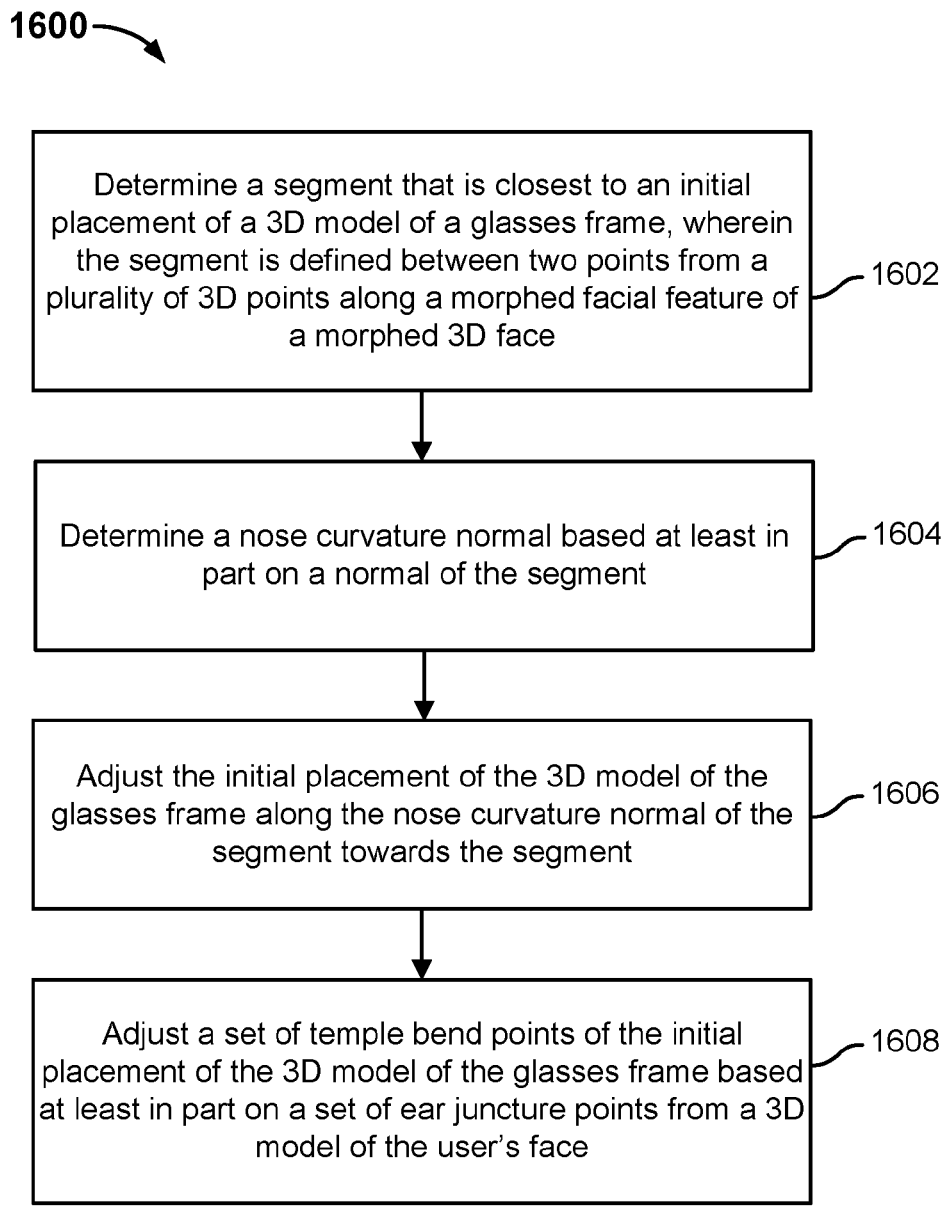
FIG. 16 is a flow diagram showing an example process for modifying an initial placement between a 3D model of a glasses frame relative to a 3D model of a user's face using a plurality of 3D points along a facial feature of a morphed 3D face.

FIG. 16 is a flow diagram showing an example process for modifying an initial placement between a 3D model of a glasses frame relative to a 3D model of a user's face using a plurality of 3D points along a facial feature of a morphed 3D face. In some embodiments, process 1600 is implemented at system 100 of FIG. 1. Specifically, in some embodiments, process 1600 is implemented at server 108 of system 100 of FIG. 1.

At 1602, a segment that is closest to an initial placement of a 3D model of a glasses frame is determined, wherein the segment is defined between two points from a plurality of 3D points along a morphed facial feature of a morphed 3D face. In various embodiments, a morphed 3D face refers to a predetermined 3D face that has been morphed to correspond to a 3D model of a user's face (that has been determined from a set of images of the user's face). In various embodiments, a set of 3D points along a facial feature of a morphed 3D face can be determined using a process such as process 1200 of FIG. 12. In various embodiments, a "segment" is defined as a distance between two adjacent points of the set of 3D points along a facial feature of a morphed 3D face. In various embodiments, the facial feature of the morphed 3D face with which the set of 3D points is associated is the nose curvature. There are at least two points in the set of 3D points so there is at least one segment that is defined by the set of 3D points. The segment that is the closest to the initial placement of the 3D model of the glasses frame (e.g., the initial placement of the 3D model of the glasses frame is determined using a process such as process 1000 of FIG. 10) is determined. For example, the following can be performed to determine the closest segment to the initial placement of the 3D model of the glasses frame: Each 3D model of a glasses frame includes a segment of mesh between its two bridge points. This bridge segment is expected to "touch" the user's face. Each segment is just a list of mesh vertices. The morphed set of 3D points along the morphed nose curvature of the morphed 3D face includes a segment in between every pair of adjacent points. Each segment for the 3D points along the morphed nose curvature of the morphed 3D face and between the bridge points of the 3D model of the glasses frame defines a line in 3D space. Since the number of segments in both the set of 3D points along the morphed nose curvature and between the bridge points of the 3D model of the glasses frame are small, the distance between each segment along the morphed nose curvature and the segment between the bridge points of the 3D model of the glasses frame is iteratively computed to determine a particular segment between two adjacent 3D points along the morphed nose curvature that is the shortest distance (and is therefore the closest) to the segment between the bridge points of the 3D model of the glasses frame to determine the initial placement of the 3D model of the glasses frame.

At 1604, a nose curvature normal is determined based at least in part on a normal of the segment. A normal (e.g., a perpendicular vector) relative to the determined segment is computed and is referred to as a "nose curvature normal."

At 1606, the initial placement of the 3D model of the glasses frame is adjusted along a normal of the segment towards the segment. The initial placement of the 3D model of the glasses frame is moved along the nose curvature normal of the determined segment towards the segment so that the bridge points of the 3D model of the glasses frame are close to the segment. For example, the initial placement of the 3D model of the glasses frame is moved along the nose curvature normal of the determined segment towards the segment until the segment between the bridge points of the 3D model of the glasses frame is within a predetermined threshold distance from the identified segment of the nose curvature.

At 1608, a set of temple bend points of the initial placement of the 3D model of the glasses frame is adjusted based at least in part on a set of ear juncture points of the 3D model of a user's face. To ensure that the temples of the 3D model of the glasses frame appear to "wrap" the user's face, the temple bend points of the 3D model of the glasses frame are aligned with the temple bend points of the set of ideal glasses 3D points (which, in some embodiments, are equivalent to the ear juncture points of the 3D model of the user's face). For example, each 3D model of a glasses frame mesh has vertices, which are marked as temple bend points. The vertex associated with each temple bend point of the 3D model of the glasses frame is moved so that it has similar coordinates in 3D space as a corresponding ear juncture point in the 3D model of the user's face. After the temple bend points of the 3D model of the glasses frame are moved to be closer to the corresponding ear juncture points in the 3D model of the user's face, the other vertices of the temples of the 3D model of the glasses frame are transformed as well so that the other vertices of the temples will have only minor deformation. In short, the temple bend points of the 3D model of the glasses frame are just "bent" so that they "touch" the ear juncture points of the 3D model of the user's face.

Figure 17:
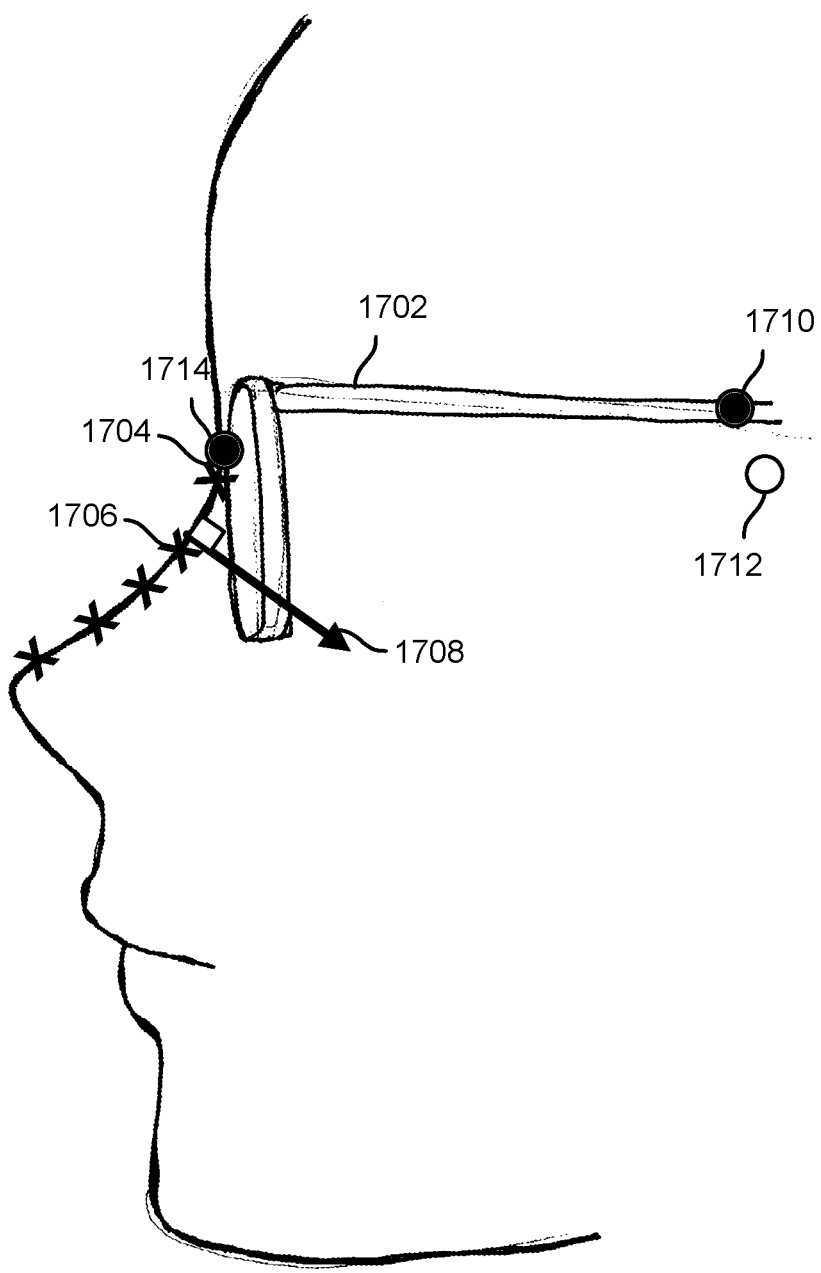
FIG. 17 is a diagram showing an example of modifying an initial placement between a 3D model of a glasses frame relative to a 3D model of a user's face using a plurality of 3D points along a facial feature of a morphed 3D face.

FIG. 17 is a diagram showing an example of modifying an initial placement between a 3D model of a glasses frame relative to a 3D model of a user's face using a plurality of 3D points along a facial feature of a morphed 3D face. Process 1600 of FIG. 16 is applied in the example of FIG. 17 to modify the initial placement of the 3D model of the glasses frame. In the example of FIG. 17, the 3D points along the facial feature of the nose curvature from a morphed 3D face (e.g., a predetermined 3D face that has been morphed to correspond to a 3D model of a user's face) are each denoted by an angled "X." A segment is defined (not shown) between every pair of adjacent 3D points along the nose curvature and the segment between 3D point 1704 and 3D point 1706 is determined to be the closest segment to 3D model of a glasses frame 1702. Normal 1708 relative to the determined segment is determined and referred to as the nose curvature normal. 3D model of the glasses frame 1702 is then moved towards the segment along normal 1708 until the bridge points (including bridge point 1714) of 3D model of the glasses frame 1702 are close to the determined segment. Furthermore, the temple bend points (such as temple bend point 1710) of 3D model of the glasses frame 1702 are bent so that they align with the ear juncture points (including ear juncture point 1712) of the 3D model of the user's face.

Figure 18:
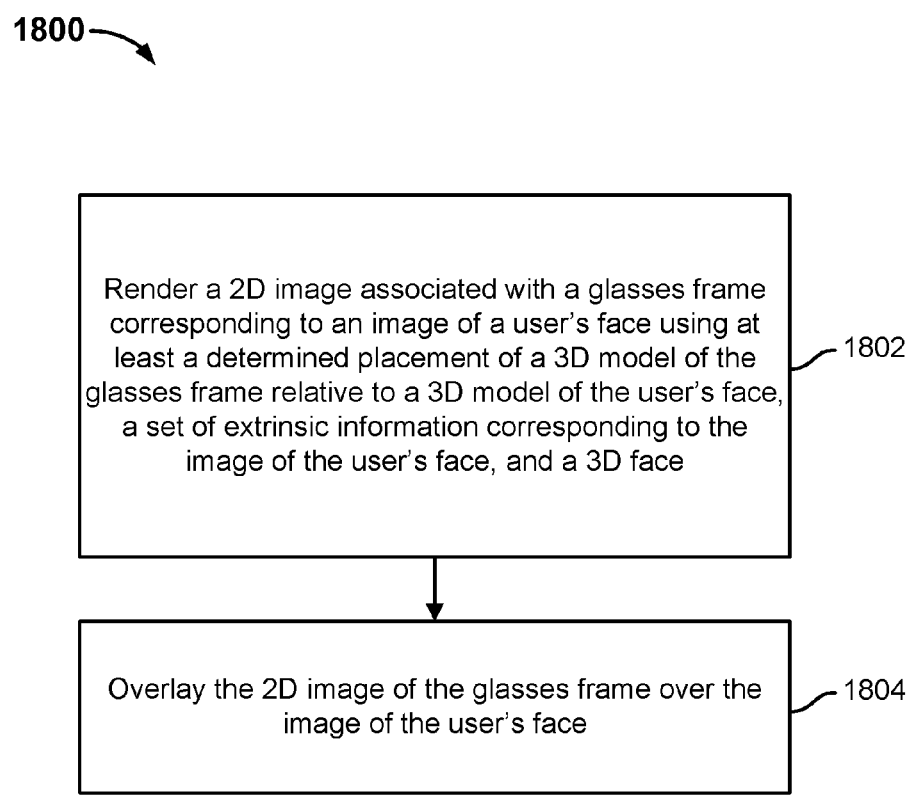
FIG. 18 is a flow diagram showing an embodiment of a process for rendering a glasses frame.

FIG. 18 is a flow diagram showing an embodiment of a process for rendering a glasses frame. In some embodiments, process 1800 is implemented at system 100 of FIG. 1. Although rendering a glasses frame is described herein, other items can be rendered using a process such as process 1800. Examples of other items include articles that can be worn on the body and/or head such as clothing and jewelry.

In some embodiments, the glasses frame is selected by a user from among a list of glasses frames presented to the user. For example, the glasses frames on the list are selected by the server to comprise relatively good fits to the facial features of the user. The user may select a glasses frame that he or she would like to virtually try-on.

At 1802, the glasses frame is rendered using at least a determined placement of a 3D model of the glasses frame relative to a 3D model of a user's face, a set of extrinsic information corresponding to the image of the user's face, and a 3D face. In some embodiments, a 3D model of the glasses frame is obtained. In some embodiments, the glasses frame is selected by a user from among a list of glasses frames presented to the user. For example, the glasses frames on the list that are selected by the server comprise relatively good fits to the facial features of the user. The user may select a glasses frame that he or she would like to virtually try-on.

In various embodiments, the determined placement of a 3D model of the glasses frame relative to a 3D model of a user's face is first determined using at least one of various processes such as process 800 of FIG. 8 and process 1600 of FIG. 16. In some embodiments, the placement of the 3D model of the glasses frame comprises a set of 3D points that various portions of the glasses frame (e.g., bridge points, temple bend points, etc.) should be at to align with the 3D model of the user's face. In some embodiments, the placement of the 3D model of the pair of glasses frames comprises a set of rotation and/or translation information that is used to transform the 3D model of the glasses frame in 3D space so that various 3D points (e.g., bridge points, temple bend points, etc.) of the 3D model of the glasses frame should be aligned with the 3D points that make up the 3D model of the user's face. In some embodiments, the 3D model of the selected glasses frame is referred to as a G matrix. In some embodiments, the 3D face that is to be used as an occlusion body comprises a 3D model of a user's face. In some other embodiments, the 3D face that is to be used as an occlusion body comprises a morphed 3D face (e.g., that is determined using a process such as process 1200 of FIG. 12). For example, the 3D face (regardless if it is a morphed 3D face or the 3D model of the user's face or another model) is also referred to as an F matrix. In some embodiments, the set of extrinsic information associated with the image for which the glasses frame is to be rendered can be represented by the (R, t) pair determined for that image. In some embodiments, if the physical dimensions of the 3D model of the user's face is known, then the scale can be computed so it transforms the 3D model of the glasses frame units into absolute units, e.g., millimeters. If the physical dimensions of the 3D model of the user's face are not known, the scale of the 3D model of the glasses frame will be computed to fit the person's face "ideally." Specifically, for example, the scale can be computed such that the glasses' width will be equal to the weighted average of the distance between the ear junctures and the distance between the external eye corners of the 3D model of the user's face.

After the 3D model of the glasses frame is placed onto the 3D model of the user's face, the glasses frame may be rendered to match the orientation of user's face in one or more images. To render the placed 3D model of the glasses frame to correspond to the appropriate orientation of a particular image, the model, the G matrix, associated with the glasses frame (that has already been transformed to correspond to the appropriate locations to fit the 3D model of the user's face) is (further) transformed by the (R, t) pair corresponding to the image such that R×G+t, the transformed glasses frame model, reflects the orientation of the glasses frame in which it would appear on the user's face in that image. In some embodiments, the model associated with the glasses frame, the G matrix, is placed onto the 3D face, the F matrix, using the determined placement and the combination of the 3D face (the F matrix) and the model associated with the glasses frame (the G matrix) are then both transformed by the (R, t) pair corresponding to the image. In some embodiments, a different coordinate system is used to determine the placement of the 3D model of the glasses frame on the 3D model of the user's face than the coordinate system that is used to determine the orientation of the 3D model of the glasses frame to match that of an image. Then occlusion culling is performed on the transformed glasses frame during the rendering of the glasses frame for that image such that the portions of the glasses frame that are hidden (occluded) by the user's face and/or other head related features (e.g., the user's hair) are not included in the rendering of the 2D image of the glasses frame. Because the 3D face (the F matrix) is used here to determine occlusions for the glasses, the model is sometimes referred to as an "occlusion body." Furthermore, the transformed and/or occluded glasses frame may be projected onto the 2D surface of the camera associated with the set of images using a matrix I associated with the camera associated with the set of images.

At 1804, the 2D image of the glasses frame is overlaid on the image of the user's face. In various embodiments, the rendered 2D image of the glasses frame is overlaid on the original image during a playback to the user of at least a subset of the set of images. If 1802 and 1804 were repeated to determine the rendered 2D image of the glasses frame for each of at least a subset of the set of images, then the at least subset can be played back to the user with the corresponding rendered 2D images of the glasses frame (e.g., at the corresponding orientations) to create an experience for the user of virtually trying on the selected glasses frame by simply watching the playback. The playback of the originally recorded video or series of snapshots with the rendered 2D images of the glasses frame will show the user the same video that was recorded with the addition of an overlay of a rendered glasses frame corresponding to each image of the set of images. As a result, in the playback of the video, the 2D image renderings of the glasses frame appear to track the user's face in corresponding images. The user may even interact/control the playback using an input (e.g., mouse movement and/or finger movement on a touch screen) to adjust the playback of the video to view different angles of the user's face with the rendered glasses frame as the user would move his or her head around during a physical try-on of the selected glasses frame in a store.

FIG. 19 is a diagram showing three example occlusions of a glasses frame at three different orientations. The diagram shows a 3D model of a glasses frame fitted on a 3D face (e.g., which can be the 3D model of the user's face or the morphed 3D face) at three different orientations. For example, the 3D model may comprise a generic face or a model determined for a specific user. As shown in the example, different portions of the glasses frame are visible at different orientations of the 3D face. Rendering of the glasses frame 1904 at orientation 1902 shows only one temple of the glasses frame, while the other temple is hidden (occluded) by the 3D model of the 3D face. Rendering of the glasses frame 1908 at orientation 1906 shows neither temples of the glasses frame because both temples are mostly obscured (occluded) from view when looking directly at the front of the 3D face. Rendering of the glasses frame 1912 at orientation 1910 shows only one temple of the glasses frame (the temple that is hidden in orientation 1902), while the other temple (the temple that is visible in orientation 1902) is hidden (occluded) by the 3D face. As such, to create a realistic rendering of the glasses frame on different orientations of the 3D face, the glasses frame is rendered with the 3D face to achieve the correct occlusions of the glasses frame at each orientation associated with a 3D face (e.g., in a particular image). For example, in rendering the glasses frame for a particular orientation, a ray tracing process will take into account areas of the glasses frame that are occluded by the 3D face and exclude such portions of the glasses frame from being present in the rendered version.

Figure 21:
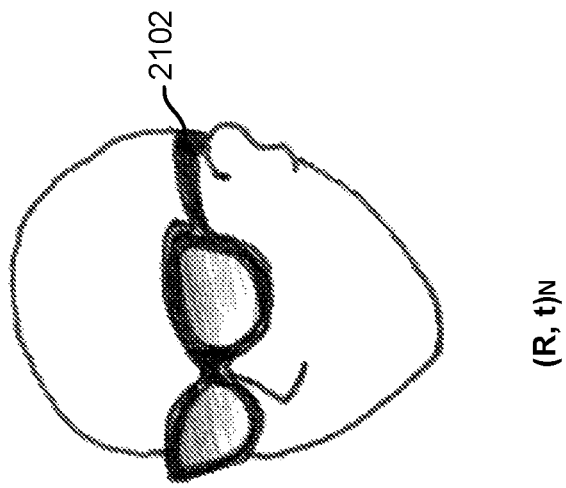
FIG. 21 shows a 2D image rendering of a glasses frame on a 3D model of a generic face.
Figure 20:
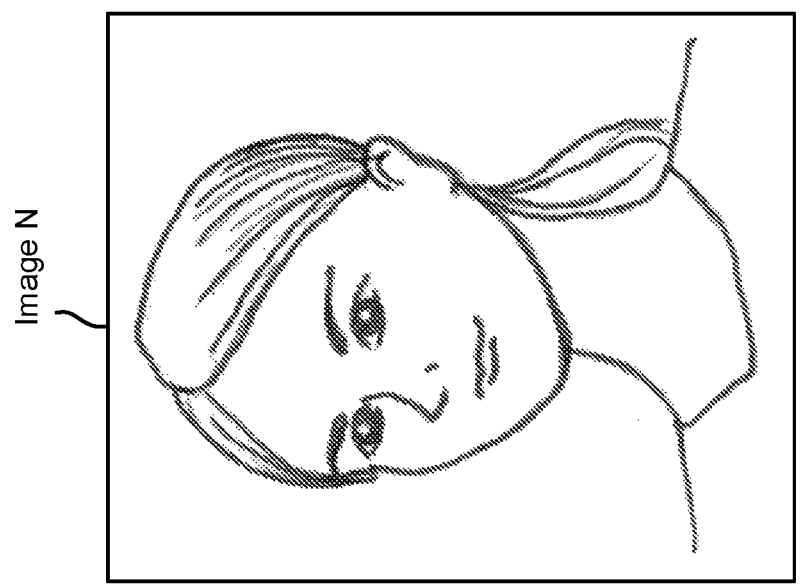
FIG. 20 is a diagram showing an embodiment of an image.
Figure 22:
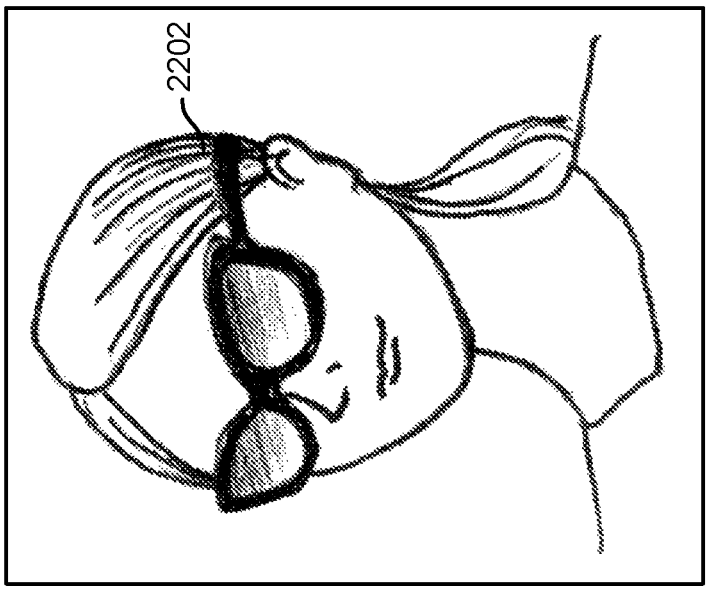
FIG. 22 is a diagram showing an embodiment of the image overlaid with the rendered 2D image of the glasses frame.

FIGS. 20 through 22 show an example of rendering a 2D image of a glasses frame for an image of a set of images of a user's face.

FIG. 20 is a diagram showing an embodiment of an image. For example, assume that the image, identified as Image N, is included in a recorded set of images associated with a user's face at various orientations. Image N shows one particular orientation of the user's face. A set of extrinsic information associated with Image N, the $(R, t)_N$ matrix, is computed. FIG. 21 shows a 2D image rendering of a glasses frame on a 3D model of a generic face. In the example, glasses frame 2102 is rendered in an orientation and translation corresponding to the user's face in Image N using the $(R, t)_N$ matrix. As shown in the example, the rendered version of glasses frame 2102 does not show a temple that is hidden (occluded) by the 3D face at the orientation associated with the $(R, t)_N$ matrix. In the example, the 3D face includes two ears but no hair. In another example, the 3D face that is used may include modeling of hair associated with the user in the set of images such that occlusions made by the modeled hair with respect to the glasses frame can also be determined in the rendering.

FIG. 22 is a diagram showing an embodiment of the image overlaid with the rendered 2D image of the glasses frame. As shown in the example, Image N is now overlaid with the version of glasses frame 2202 that was rendered using the $(R, t)_N$ matrix in FIG. 21. In some embodiments, the light sources in each image and/or environment of the recorded set of images are taken into account to produce photo realistic glasses renderings to be displayed with the images. The process of rendering may be performed on each of at least a subset of other images in the recorded set of images to which Image N belongs so that renderings of the glasses frame can be determined for several different orientations of the user's face.

Figure 23A:
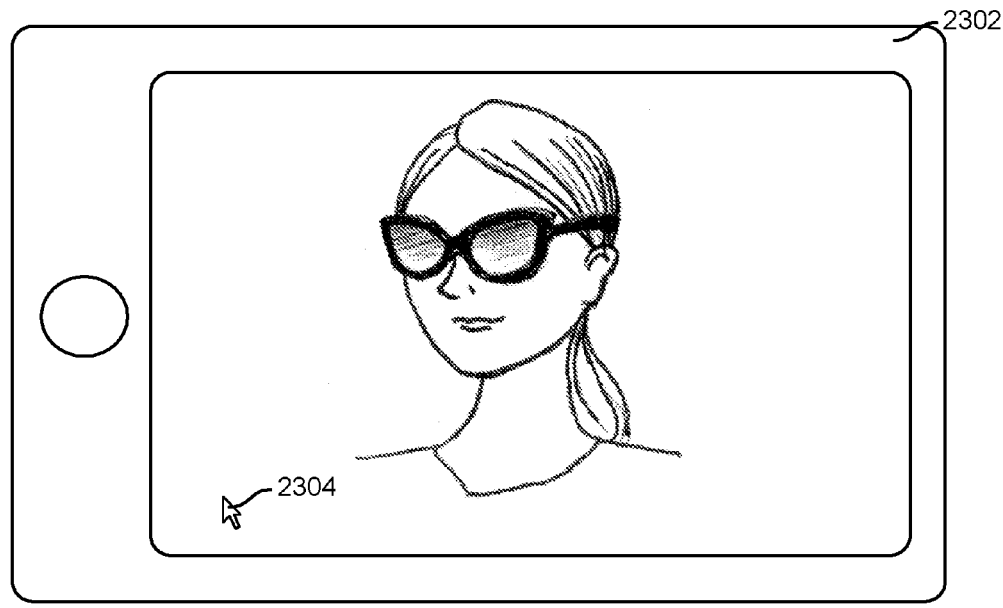
FIGS. 23A and 23B show examples of an interactive playback of a recorded set of images overlaid with 2D image renderings of a glasses frame.
Figure 23B:
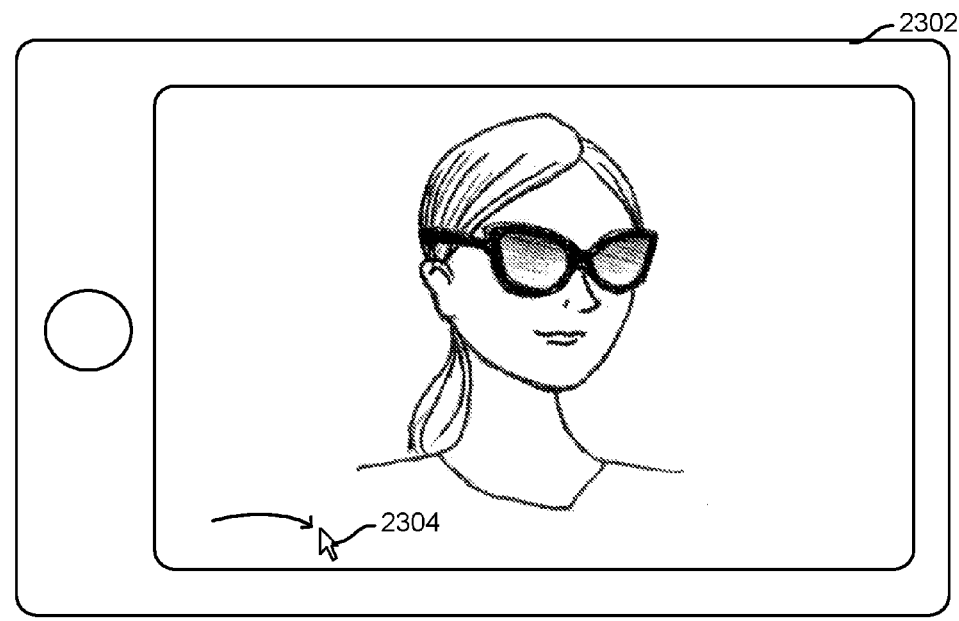

FIGS. 23A and 23B show examples of an interactive playback of a recorded set of images overlaid with 2D image renderings of a glasses frame. Continuing the examples of FIGS. 20, 21, and 22, the set of images to which Image N belonged may be played back at a display associated with client device 2302. The playback may include corresponding ones of the set of images overlaid with respective renderings of the glasses frame. A user may interact with the playback to control for example, the speed at which the playback is performed and which images/orientations the user wishes to view. In a first example, if client device 2302 is a laptop screen, then the user can control cursor 2304 (e.g., with a mouse device) to adjust the playback of the set of images with overlaid renderings. In a second example, if client device 2302 is a tablet device with a touch screen, then cursor 2304 may comprise the user's finger touching the screen to adjust the playback of the set of images with overlaid renderings. FIG. 23A shows an image of a user looking to the left. Dragging cursor 2304 to the right in FIG. 23B results in the image showing the user looking to the right. While cursor 2304 was being dragged from the position it was in FIG. 23A to the position it is in FIG. 23B, several images of the user's face overlaid with the rendered glasses seemingly turning from left to right may appear on the display of client device 2302. This is merely one example of a user interaction with the playback of the set of images and other types of user interaction may be used as well.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system, comprising:
a processor configured to:
    obtain a three-dimensional (3D) model of a user's face, wherein the 3D model of the user's face comprises a plurality of 3D points;
    determine a face normal that is normal to a plane, wherein the plane is determined based at least in part on a first subset of 3D points from the plurality of 3D points;
    determine a set of computed bridge points based at least in part on a second subset of 3D points from the plurality of 3D points and the face normal; and
    use the set of computed bridge points to determine an initial placement of a 3D model of a glasses frame relative to the 3D model of the user's face; and a memory coupled to the processor and configured to store the 3D model of the user's face.

2. The system of claim 1, wherein the 3D model of the user's face is determined from a set of images that includes the user's face.

3. The system of claim 1, wherein the plane is determined based at least in part on a corresponding distance between the plane and each 3D point in the first subset of 3D points.

4. The system of claim 1, wherein the first subset of 3D points comprises a set of internal eye corner points and a set of ear juncture points, wherein the second subset of 3D points comprises the set of internal eye corners points and a set of internal eyebrow points, wherein to determine the set of computed bridge points based at least in part on the second subset of 3D points and the face normal comprises to:
compute a distance along the face normal between the set of internal eyebrow points and the set of internal eye corner points;
determine a bridge shift based at least in part on the distance; and
apply the bridge shift to each of the set of internal eye corner points along the face normal.

5. The system of claim 1, wherein to use the set of computed bridge points to determine the initial placement of the 3D model of the glasses frame relative to the 3D model of the user's face comprises to:
align the set of computed bridge points and a set of bridge points of the 3D model of the glasses frame; and
adjust a set of temple bend points of the 3D model of the glasses frame based at least in part on a set of ear juncture points from the 3D model of the user's face.

6. The system of claim 1, wherein the processor is further configured to:
morph a predetermined 3D face to correspond to the 3D model of the user's face to obtain a morphed 3D face, wherein the predetermined 3D face includes a plurality of 3D points along a facial feature; and
determine a morphed set of 3D points along a morphed facial feature of the morphed 3D face based at least in part on the plurality of 3D points along the facial feature.

7. The system of claim 6, wherein the processor is further configured to adjust the initial placement of the 3D model of the glasses frame relative to the 3D model of the user's face based at least in part on the morphed set of 3D points along the morphed facial feature of the morphed 3D face.

8. The system of claim 6, wherein the facial feature comprises a nose curvature, wherein the processor is further configure to:
determine a segment that is closest to the initial placement of the 3D model of the glasses frame, wherein the segment is defined between two points from the morphed set of 3D points along the morphed facial feature of the morphed 3D face;
determine a nose curvature normal based at least in part on a normal of the segment;
adjust the initial placement of the 3D model of the glasses frame along the nose curvature normal of the segment towards the segment; and
adjust a set of temple bend points of the initial placement of the 3D model of the glasses frame based at least in part on a set of ear juncture points from the 3D model of the user's face.

9. The system of claim 1, wherein the processor is further configured to:
render a two-dimensional (2D) image associated with the glasses frame corresponding to an image of the user's face using at least the initial placement of the 3D model of the glasses frame relative to the 3D model of the user's face, a set of extrinsic information corresponding to the image of the user's face, and a 3D face; and
overlay the 2D image of the glasses frame over the image of the user's face.

10. The system of claim 9, wherein the set of extrinsic information corresponding to the image of the user's face describes an orientation of the user's face in the image.

11. A method, comprising:
obtaining a three-dimensional (3D) model of a user's face, wherein the 3D model of the user's face comprises a plurality of 3D points;
determining a face normal that is normal to a plane, wherein the plane is determined based at least in part on a first subset of 3D points from the plurality of 3D points;
determining a set of computed bridge points based at least in part on a second subset of 3D points from the plurality of 3D points and the face normal; and
using the set of computed bridge points to determine an initial placement of a 3D model of a glasses frame relative to the 3D model of the user's face.

12. The method of claim 11, wherein the 3D model of the user's face is determined from a set of images that includes the user's face.

13. The method of claim 11, wherein the plane is determined based at least in part on a corresponding distance between the plane and each 3D point in the first subset of 3D points.

14. The method of claim 11, wherein the first subset of 3D points comprises a set of internal eye corner points and a set of ear juncture points, wherein the second subset of 3D points comprises the set of internal eye corners points and a set of internal eyebrow points, wherein determining the set of computed bridge points based at least in part on the second subset of 3D points and the face normal comprises:
computing a distance along the face normal between the set of internal eyebrow points and the set of internal eye corner points;
determining a bridge shift based at least in part on the distance; and
applying the bridge shift to each of the set of internal eye corner points along the face normal.

15. The method of claim 11, wherein using the set of computed bridge points to determine the initial placement of the 3D model of the glasses frame relative to the 3D model of the user's face comprises:
aligning the set of computed bridge points and a set of bridge points of the 3D model of the glasses frame; and
adjusting a set of temple bend points of the 3D model of the glasses frame based at least in part on a set of ear juncture points from the 3D model of the user's face.

16. The method of claim 11, further comprising:
morphing a predetermined 3D face to correspond to the 3D model of the user's face to obtain a morphed 3D face, wherein the predetermined 3D face includes a plurality of 3D points along a facial feature; and
determining a morphed set of 3D points along a morphed facial feature of the morphed 3D face based at least in part on the plurality of 3D points along the facial feature.

17. The method of claim 16, further comprising adjusting the initial placement of the 3D model of the glasses frame relative to the 3D model of the user's face based at least in part on the morphed set of 3D points along the morphed facial feature of the morphed 3D face.

18. The method of claim 16, wherein the facial feature comprises a nose curvature, and further comprising:
- determining a segment that is closest to the initial placement of the 3D model of the glasses frame, wherein the segment is defined between two points from the morphed set of 3D points along the morphed facial feature of the morphed 3D face;
- determining a nose curvature normal based at least in part on a normal of the segment;
- adjusting the initial placement of the 3D model of the glasses frame along the nose curvature normal of the segment towards the segment; and
- adjusting a set of temple bend points of the initial placement of the 3D model of the glasses frame based at least in part on a set of ear juncture points from the 3D model of the user's face.

19. The method of claim 11, further comprising:
- rendering a two-dimensional (2D) image associated with the glasses frame corresponding to an image of the user's face using at least the initial placement of the 3D model of the glasses frame relative to the 3D model of the user's face, a set of extrinsic information corresponding to the image of the user's face, and a 3D face; and
- overlaying the 2D image of the glasses frame over the image of the user's face.

20. A computer program product, the computer program product being embodied in a non-transitory computer readable storage medium and comprising computer instructions for:
- obtaining a three-dimensional (3D) model of a user's face, wherein the 3D model of the user's face comprises a plurality of 3D points;
- determining a face normal that is normal to a plane, wherein the plane is determined based at least in part on a first subset of 3D points from the plurality of 3D points;
- determining a set of computed bridge points based at least in part on a second subset of 3D points from the plurality of 3D points and the face normal; and
- using the set of computed bridge points to determine an initial placement of a 3D model of a glasses frame relative to the 3D model of the user's face.

21. The system of claim 1, wherein the determination of an initial placement of a 3D model of a glasses frame relative to the 3D model of the user's face is based at least in part on aligning the set of computed bridge points with bridge points of the 3D model of the glasses frame.

* * * * *